United States Patent
Papasakellariou et al.

(10) Patent No.: US 9,215,665 B2
(45) Date of Patent: *Dec. 15, 2015

(54) UPLINK TRANSMISSION POWER CONTROL IN MULTI-CARRIER COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/587,461

(22) Filed: Dec. 31, 2014

(65) Prior Publication Data

US 2015/0117384 A1    Apr. 30, 2015

Related U.S. Application Data

(63) Continuation of application No. 12/725,847, filed on Mar. 17, 2010, now Pat. No. 8,971,299.

(60) Provisional application No. 61/160,879, filed on Mar. 17, 2009.

(51) Int. Cl.
*H04W 52/18* (2009.01)
*H04W 52/14* (2009.01)
(Continued)

(52) U.S. Cl.
CPC ............. *H04W 52/18* (2013.01); *H04L 1/1812* (2013.01); *H04L 5/0007* (2013.01); *H04L 5/0092* (2013.01); *H04L 27/18* (2013.01); *H04W 52/146* (2013.01); *H04W 52/281* (2013.01); *H04W 52/325* (2013.01); *H04W 52/346* (2013.01);
(Continued)

(58) Field of Classification Search
None
See application file for complete search history.

(56) References Cited

U.S. PATENT DOCUMENTS 6,904,290 B1    6/2005  Palenius
7,050,824 B2 *  5/2006  Masseroni et al. ............ 455/522
(Continued)

FOREIGN PATENT DOCUMENTS

| | | |
|---|---|---|
| CA | 2 682 219 | 10/2008 |
| EP | 2034764 | 3/2009 |
| KR | 1020060015192 | 2/2006 |

OTHER PUBLICATIONS

PCT/ISA/237 Written Opinion issued in PCT/US2010/027653 (4pp.).
(Continued)

*Primary Examiner* — Hassan Phillips
*Assistant Examiner* — Omeed D Rahgozar
(74) *Attorney, Agent, or Firm* — The Farrell Law Firm, P.C.

(57) ABSTRACT

Disclosed are a method and apparatus for wireless communication by and in a base station (BS) and a user equipment (UE). The method by the UE includes determining a first power for transmitting both first data and control information on a first physical uplink shared channel (PUSCH), determining a second power for transmitting second data on a second PUSCH, reducing the second power if a sum of the determined first power and the determined second power exceeds a predetermined value, and transmitting the first data and the control information on the first PUSCH using the determined first power, and transmitting the second data on the second PUSCH using the reduced second power.

20 Claims, 14 Drawing Sheets

(51) Int. Cl.
| | |
|---|---|
| H04W 52/34 | (2009.01) |
| H04W 52/36 | (2009.01) |
| H04W 52/28 | (2009.01) |
| H04W 52/32 | (2009.01) |
| H04L 27/18 | (2006.01) |
| H04L 1/18 | (2006.01) |
| H04W 72/04 | (2009.01) |
| H04L 5/00 | (2006.01) |
| H04W 52/24 | (2009.01) |

(52) U.S. Cl.
CPC ........ *H04W 52/367* (2013.01); *H04W 72/0446* (2013.01); *H04L 5/001* (2013.01); *H04W 52/241* (2013.01); *H04W 52/34* (2013.01); *Y02B 60/50* (2013.01)

(56) References Cited

U.S. PATENT DOCUMENTS

| | | | |
|---|---|---|---|
| 8,204,449 B2 * | 6/2012 | Kwak et al. | 455/69 |
| 2003/0210668 A1 | 11/2003 | Malladi et al. | |
| 2006/0003787 A1 | 1/2006 | Heo et al. | |
| 2011/0306383 A1 * | 12/2011 | Lee et al. | 455/522 |

OTHER PUBLICATIONS

LG Electronics, "Uplink Multiple Channel Transmission in Case of UE Transmit Power Limitation", R1-090655, 3GPP TSG RAN WG1#56, Feb. 9-13, 2009.

3rd Generation Partnership Project; Technical Specification Group Radio Access Network; Physical Layer Procedures (FDD) (Release 8), 3GPP TS 25.214 V8.4.0, Dec. 2008.

* cited by examiner

UPLINK TRANSMISSION POWER CONTROL IN MULTI-CARRIER COMMUNICATION SYSTEMS

PRIORITY

This application is a Continuation application of U.S. patent application Ser. No. 12/725,847, which was filed in the U.S. Patent and Trademark Office on Mar. 17, 2010, and claims priority under 35 U.S.C. §119(e) to U.S. Provisional Application No. 61/160,879, entitled "Transmission Power Control in Uplink of Multi-Carrier Communication Systems", which was filed on Mar. 17, 2009, the contents of which are incorporated herein by reference.

BACKGROUND OF THE INVENTION

1. Field of the Invention

The present invention is directed generally to wireless communication systems and, more specifically, to transmission power control for data signals and control signals.

2. Description of the Art

A communication system includes DownLink (DL), which supports signal transmissions from a base station (i.e., a "Node B") to User Equipments (UEs), and UpLink (UL), which supports signal transmissions from UEs to the Node B. UEs, which are also commonly referred to as a terminal or a mobile station, may be fixed or mobile and may include wireless devices, cellular phones, personal computer devices, etc. Node Bs are generally fixed stations and may also be referred to as Base Transceiver Systems (BTS), access points, or other similar terminology.

UL signals contain data information, which may include Uplink Control Information (UCI). The UCI includes at least ACKnowledgement (ACK) signals, Service Request (SR) signals, Channel Quality Indicator (CQI) signals, Precoding Matrix Indicator (PMI) signals, or Rank Indicator (RI) signals. UCI may be transmitted individually in the Physical Uplink Control CHannel (PUCCH) or, together with other non-UCI data, in a Physical Uplink Shared CHannel (PUSCH).

ACK signals used in association with Hybrid Automatic Repeat reQuests (HARQs), will be referred to as HARQ-ACK signals, and are transmitted in response to correct or incorrect reception of Transport Blocks (TBs) transmitted through a Physical Downlink Shared CHannel (PDSCH). SR signals inform the Node B that a UE has additional data for transmission. CQI signals inform the Node B of the channel conditions that a UE experiences for DL signal reception, enabling the Node B to perform channel-dependent PDSCH scheduling. PMI/RI signals inform the Node B how to combine signal transmissions to a UE through multiple Node B antennas in accordance with a Multiple-Input Multiple-Output (MIMO) principle.

PUSCH or PDSCH transmissions are either dynamically configured through a Scheduling Assignment (SA) transmitted in the Physical Downlink Control CHannel (PDCCH) or periodically configured with parameters set through higher layer signaling. For example, such configuration may be performed through Radio Resource Control (RRC) signaling from a Node B to each respective UE.

A PUSCH transmission structure is shown in FIG. 1. A Transmission Time Interval (TTI) includes one sub-frame 110, which includes two slots. Each slot 120 includes $N_{symb}^{UL}$ symbols. Each symbol 130 includes a Cyclic Prefix (CP) to mitigate interference due to channel propagation effects. The signal transmission in the first slot may be located at the same or different part of the operating BandWidth (BW) than the signal transmission in the second slot. One symbol in each slot is used to transmit Reference Signals (RS) 140, which provide a channel estimate to enable coherent demodulation of the received data and/or UCI. The transmission BW includes frequency resource units, which will be referred to as Physical Resource Blocks (PRBs). Each PRB includes $N_{sc}^{RB}$ sub-carriers, or Resource Elements (REs), and a UE is allocated $M_{PUSCH}$ PRBs 150 for a total of $M_{sc}^{PUSCH} = M_{PUSCH} \cdot N_{sc}^{RB}$ REs for a PUSCH transmission BW of the UE. The last symbol of the sub-frame may be used to transmit Sounding RS (SRS) 160 from at least one UE. The SRS mainly serves to provide a CQI estimate for the UL channel, thereby enabling the Node B to perform channel-dependent PUSCH scheduling. The Node B configures the SRS transmission parameters for a UE through RRC signaling. The number of sub-frame symbols available for data transmission is $N_{symb}^{PUSCH} = 2 \cdot (N_{symb}^{UL} - 1) - N_{SRS}$, where $N_{SRS} = 1$, if the last sub-frame symbol is used for SRS transmission and $N_{SRS} = 0$ otherwise.

FIG. 2 illustrates a PUSCH transmitter block diagram. Coded CQI bits and/or PMI bits 205 and coded data bits 210 are multiplexed at block 220. If HARQ-ACK bits are also multiplexed, data bits are punctured to accommodate HARQ-ACK bits at block 230. SR information, if any, is included as part of data information. A Discrete Fourier Transform (DFT) of the combined data bits and UCI bits is then obtained at block 240, $M_{sc}^{PUSCH} = M_{PUSCH} \cdot N_{sc}^{RB}$ REs at block 250 corresponding to the assigned PUSCH transmission BW are selected at block 255 based on information from the SA or from higher layer signaling, Inverse Fast Fourier Transform (IFFT) is performed at block 260, and finally a CP and filtering are applied to the signal at blocks 270 and 280, respectively, before transmission at block 290. For clarity and conciseness, additional transmitter circuitry such as digital-to-analog converters, analog filters, amplifiers, and transmitter antennas are not illustrated. The encoding process for data bits and CQI and/or PMI bits, as well as the modulation process, are also omitted for clarity and conciseness. The PUSCH transmission may occur over clusters of contiguous REs, in accordance with the DFT Spread Orthogonal Frequency Multiple Access (DFT-S-OFDM) principle, which allows signal transmission over one cluster 295A (also known as Single-Carrier Frequency Division Multiple Access (SC-FDMA)), or over multiple clusters 295B.

At the receiver, reverse (complementary) transmitter operations are performed. FIG. 3 illustrates the reverse transmitter operations of the transmitter operations illustrated in FIG. 2. After an antenna receives the Radio-Frequency (RF) analog signal at 310, which may be processed by processing units such as filters, amplifiers, frequency down-converters, and analog-to-digital converters (not illustrated), a digital signal is filtered at block 320 and the CP is removed at block 330. Subsequently, the receiver unit applies a Fast Fourier Transform (FFT) at block 340, selects 345 the $M_{sc}^{PUSCH} = M_{PUSCH} \cdot N_{sc}^{RB}$ REs 350 used by the transmitter, applies an Inverse DFT (IDFT) at block 360, extracts the HARQ-ACK bits and places respective erasures for the data bits at block 370, and de-multiplexes, at block 380, output of block 370 into data bits 390 and CQI/PMI bits 395. Regarding the transmitter, well known receiver functionalities such as channel estimation, demodulation, and decoding are not shown for clarity and conciseness.

A structure for the HARQ-ACK signal transmission in the PUCCH in one sub-frame slot is illustrated in FIG. 4. A transmission in the other slot, which may be at a different part of the operating BW, may have the same structure as the slot illustrated in FIG. 4, or alternatively, as with the PUSCH, the last symbol may be punctured to transmit SRS. The PUCCH transmission for each UCI signal is assumed to be within one PRB. The HARQ-ACK transmission structure 410 includes the transmission of HARQ-ACK signals and RS. The HARQ-ACK bits 420 are modulated, at block 430, according to a "Constant Amplitude Zero Auto-Correlation (CAZAC)" sequence 440, for example with Binary Phase Shift Keying (BPSK) or Quaternary Phase Shift Keying (QPSK) modulation, which is then transmitted after performing the IFFT operation. Each RS 450 is transmitted through the unmodulated CAZAC sequence.

A structure for the CQI/PMI transmission in the PUCCH in one sub-frame slot is illustrated in FIG. 5. The CQI transmission structure 510 includes the transmission of CQI signals and RS. The CQI bits 520 again are modulated, at block 530, according to a CAZAC sequence 540, for example using QPSK modulation, which is then transmitted after performing the IFFT operation. Each RS 550 is again transmitted through the unmodulated CAZAC sequence.

An example of CAZAC sequences is determined according to $$c_k(n) = \exp\left[\frac{j2\pi k}{L}\left(n + n\frac{n+1}{2}\right)\right]$$

where L is the length of the CAZAC sequence, n is the index of an element of the sequence n={0, 1, ..., L−1}, and k is the index of the sequence. If L is a prime integer, there are L−1 distinct sequences which are defined as k ranges in {0, 1, ..., L−1}. If a PRB includes an even number of REs, such as, for example, $N_{sc}^{RB}$=12, CAZAC sequences with an even length can be directly generated through a computer search for sequences satisfying the CAZAC properties.

FIG. 6 shows a transmitter structure for a CAZAC sequence. The frequency-domain version of a computer generated CAZAC sequence 610 is described, as an example. The REs of the assigned PUCCH PRB are selected at block 620 for mapping, at block 630, the CAZAC sequence An IFFT is performed at block 640, and a Cyclic Shift (CS) is applied to the output at block 650. Finally, a CP and filtering are applied at blocks 660 and 670, respectively, before transmitting the signal at block 680. Zero padding is inserted by the reference UE in REs used for the signal transmission by other UEs and in guard REs (not shown). Moreover, for clarity and conciseness, additional transmitter circuitry such as digital-to-analog converter, analog filters, amplifiers, and transmitter antennas as they are known in the art, are not shown.

Reverse (complementary) transmitter operations of the operations illustrated in FIG. 6 are performed for the reception of the CAZAC sequence, as illustrated in FIG. 7. Referring to FIG. 7, an antenna receives an RF analog signal at block 710. After processing by processing units such as filters, amplifiers, frequency down-converters, and analog-to-digital converters (not shown), the received digital is filtered at block 720 and the CP is removed at block 730. Subsequently, the CS is restored at block 740, a Fast Fourier Transform (FFT) is applied at block 750, and the transmitted REs are selected at block 765 based on information from the SA or from higher layer signaling. FIG. 7 also shows the subsequent correlation 770 with the replica 780 of the CAZAC sequence in order to obtain an estimate of the channel medium (possibly modulated by HARQ-ACK information or CQI information as shown in FIG. 4 or FIG. 5, respectively). Finally, the output 790 is obtained, which can then be passed to a channel estimation unit, such as a time-frequency interpolator, in case of a RS, or can to detect the transmitted information, in case the CAZAC sequence is modulated by HARQ-ACK information or CQI.

When UCI and data transmission occur in the same sub-frame, UCI may be transmitted together with data in the PUSCH or separately from data in the PUCCH. Including UCI in the PUSCH avoids simultaneous PUSCH and PUCCH transmissions, thereby conserving transmission power and avoiding an increase in the Peak-to-Average Power Ratio (PAPR) or the Cubic Metric (CM) of the combined signal transmission. Conversely, separately transmitting UCI in the PUCCH preserves PUSCH REs for data transmission and utilizes pre-allocated PUCCH resources. The required transmission power can be one of the conditions used to decide whether to simultaneously transmit PUCCH and PUSCH, to transmit UCI with data in the PUSCH, or to even transmit only UCI in the PUCCH and suspend the PUSCH transmission.

Transmission Power Control (TPC) adjusts the PUSCH or PUCCH transmission power to achieve a desired target for the received Signal to Interference and Noise Ratio (SINR) at the Node B, while reducing the interference to neighboring cells and controlling the rise of Interference over Thermal (IoT) noise, thereby ensuring the respective reception reliability targets. Open-Loop (OL) TPC with cell-specific and UE-specific parameters is considered with the capability for the Node B to also provide Closed Loop (CL) corrections through TPC commands. The TPC commands are included either in the SA configuring a dynamic PDSCH reception (TPC command adjusts the subsequent HARQ-ACK signal transmission power) or PUSCH transmission (TPC command adjusts the PUSCH transmission power), or are provided through a channel in the PDCCH carrying TPC commands (TPC channel) for PUSCH or PUCCH transmissions configured to occur periodically.

A TPC operation is described as follows based on the TPC operation used in 3$^{rd}$ Generation Partnership Project (3GPP) Evolved-Universal Terrestrial Radio Access (E-UTRA) Long Term Evolution (LTE). The PUSCH transmission power $P_{PUSCH}$ from a UE in reference sub-frame i is set according to Equation (1):

$$P_{PUSCH}(i) = \min\{P_{MAX}, 10 \cdot \log_{10} M_{PUSCH}(i) + P_{0\_PUSCH} + \alpha PL + \Delta_{TF}(i) + f(i)\} \text{ [dBm]} \quad (1)$$

where
  $P_{MAX}$ is the maximum allowed power configured by RRC and can depend on the UE power amplifier class.
  $M_{PUSCH}$ (i) is the number of (contiguous) PRBs for PUSCH transmission.
  $P_{0\_PUSCH}$ controls the mean received SINR at the Node B and is the sum of a cell-specific component $P_{O\_NOMINAL\_PUSCH}$ and a UE-specific component $P_{O\_UE\_PUSCH}$ provided by RRC.
  PL is the DL path-loss estimate from the serving Node B as calculated in the UE.
  α is a cell-specific parameter provided by RRC with 0≤α≤1. Fractional TPC is obtained for α<1 as the path-loss is not fully compensated. For α=0, pure CL TPC is provided.
  $\Delta_{TF}(i) = 10 \cdot \log_{10}(2^{K_s \cdot TBS(i)/N_{RE}(i)} - 1)$ where $K_s$≥0 is a UE-specific parameter provided by RRC, TBS(i) is the TB size, and $N_{RE}(i) = M_{PUSCH}(i) \cdot N_{sc}^{RB} \cdot N_{symb}^{PUSCH}(i)$ Therefore, $TBS(i)/N_{RE}(i)$ defines the number of coded information bits per RE (Spectral Efficiency (SE)). If $K_s$>1, such as $K_s$=1.25, $\Delta_{TF}(i)$ enables TPC based on the SE of the PUSCH transmission. TPC based on the SE of the PUSCH transmission is useful when the adaptation of the PUSCH Modulation and Coding Scheme (MCS) is slow and tracks only the path-loss. With MCS adaptation per PUSCH transmission, PUSCH power variations depending on SE should be avoided and this is achieved by setting $K_s=0$.

$f(i)=f(i-1)+\delta_{PUSCH}(i)$ is the function accumulating the CL TPC command $\delta_{PUSCH}(i)$ included in the SA configuring the PUSCH transmission in sub-frame i, or in a TPC channel in the PDCCH, with f(0) being the first value after reset of accumulation.

The PUCCH transmission power $P_{PUCCH}$ from a UE in reference sub-frame i is set according to Equation (2):

$$P_{PUCCH}(i)=\min\{P_{MAX}, P_{0\_PUCCH}PL+h(\bullet)+\Delta_{F\_PUCCH}+g(i)\} \text{ [dBm]} \quad (2)$$

where
- $P_{0\_PUCCH}$ controls the mean received SINR at the Node B and is the sum of a cell-specific component $P_{O\_NOMINAL\_PUCCH}$ and a UE-specific component $P_{O\_UE\_PUCCH}$ provided by RRC.
- $h(\bullet)$ is a function with values depending on whether HARQ-ACK, SR, or CQI is transmitted.
- $\Delta_{F\_PUCCH}$ is provided by RRC and its value depends on the transmitted UCI type.
- $g(i)=g(i=1)+\delta_{PUCCH}(i)$ is the function accumulating the CL TPC command $\delta_{PUCCH}(i)$ in the PDCCH TPC channel or in the SA configuring the PDSCH reception and g(0) is the value after reset of accumulation.

For the SRS, in order to avoid large power variations within sub-frame symbols when the UE transmits PUSCH and SRS in the same sub-frame i, the transmission power $P_{SRS}$ follows the PUSCH transmission power and is set according to Equation (3):

$$P_{SRS}(i)=\min\{P_{MAX}, P_{SRS\_OFFSET}+10\cdot\log_{10}M_{SRS}+P_{O\_PUSCH}+\alpha\cdot PL+f(i)\} \text{ [dBm]} \quad (3)$$

where
- $P_{SRS\_OFFSET}$ is a UE-specific parameter semi-statically configured by RRC
- $M_{SRS}$ is the SRS transmission BW expressed in number of PRBs.

In order to support data rates higher than data rates possible in legacy communication systems and further improve the spectral efficiency, BWs larger than BWs of a Component Carrier (CC) for legacy systems are needed. These larger BWs can be achieved through the aggregation of multiple legacy CCs. For example, a BW of 60 MHz is achieved by aggregating three 20 MHz CCs. A UE may perform multiple PUSCH transmissions during the same sub-frame in the respective UL CCs. FIG. 8 illustrates aggregation of multiple legacy CCs, where a UE has three PUSCH transmissions, PUSCH 1 810, PUSCH 2 820 and PUSCH 3 830, in parts of the BW of three respective UL CCs, UC CC1 840, UC CC2 850, and UL CC3 860, during the same sub-frame.

The TPC operation should therefore be extended to PUSCH transmissions from a UE in multiple UL CCs during the same sub-frame. Additionally, as PUSCH and PUCCH transmissions from a UE in the same sub-frame and in the same or different UL CCs are also supported, the TPC operation should also include the combined operation for the PUSCH TPC and the PUCCH TPC. As a UE may also have multiple PUCCH transmissions in the same sub-frame and in the same or different UL CCs, the PUCCH TPC operation should also include support for multiple PUCCH transmissions. As a UE may have multiple transmitter antennas, the TPC operation should support the signal transmission from multiple antennas.

Therefore, there is a need to define the PUSCH TPC operation for multiple PUSCH transmissions from a UE in the same sub-frame in the same UL CC and in multiple UL CCs. There is also a need to define the PUCCH TPC operation for multiple PUCCH transmissions, of the same or different UCI signals, from a UE in the same sub-frame in the same UL CC and in multiple UL CCs. There is also a need to define the TPC operation for multiple UE transmitter antennas. There is also a need to define the combined PUSCH and PUCCH TPC operation for multiple PUSCH transmissions and PUCCH transmissions from a UE in the same sub-frame in the same UL CC and in multiple UL CCs.

SUMMARY OF THE INVENTION

Accordingly, the present invention has been designed to solve at least the aforementioned limitations in the prior art. The present invention also provides methods and apparatuses for the TPC application to simultaneous PUSCH transmissions in multiple CCs, to simultaneous transmissions of different UCI types, to simultaneous PUSCH and PUCCH transmissions, and to signal transmissions from multiple UE transmitter antennas having respectively multiple power amplifiers.

In accordance with an aspect of the present invention, there is provided a method for wireless communication by a UE, comprising determining a first power for transmitting both first data and control information on a first PUSCH, determining a second power for transmitting second data on a second PUSCH, reducing the second power if a sum of the determined first power and the determined second power exceeds a predetermined value, and transmitting the first data and the control information on the first PUSCH using the determined first power, and transmitting the second data on the second PUSCH using the reduced second power.

In accordance with another aspect of the present invention, there is provided an apparatus for wireless communication in a UE, comprising a controller adapted to determine a first power for transmitting both first data and control information on a first PUSCH, to determine a second power for transmitting second data on a second PUSCH, and to reduce the second power if a sum of the determined first power and the determined second power exceeds a predetermined value, and a transmitter adapted to transmit the first data and the control information on the first PUSCH using the determined first power, and to transmit the second data on the second PUSCH using the reduced second power.

In accordance with another aspect of the present invention, there is provided a method for wireless communication by a base station (BS), comprising configuring, to a UE, a first PUSCH conveying both first data and control information and a second PUSCH conveying second data, transmitting parameters required for transmission power control of the first and second PUSCHs, and receiving the first data and the control information on the first PUSCH and the second data on the second PUSCH, wherein the second power is reduced if a sum of a first power determined for transmitting the first PUSCH by the UE and a second power determined for transmitting the second PUSCH by the UE exceeds a predetermined value, and wherein the first PUSCH is transmitted with the first power and the second PUSCH is transmitted with the reduced second power.

In accordance with another aspect of the present invention, there is provided an apparatus for wireless communication in a BS, comprising a controller adapted to configure, to a UE, a first PUSCH conveying both first data and control information and a second PUSCH conveying second data, a transmitter adapted to transmit parameters required for transmission power control of the first and second PUSCHs, and a receiver adapted to receive the first data and the control information on the first PUSCH and the second data on the second PUSCH, wherein the second power is reduced if a sum of a first power determined for transmitting the first PUSCH by the UE and a second power determined for transmitting the second PUSCH by the UE exceeds a predetermined value, and wherein the first PUSCH is transmitted with the first power and the second PUSCH is transmitted with the reduced second power.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS

Figure 1:
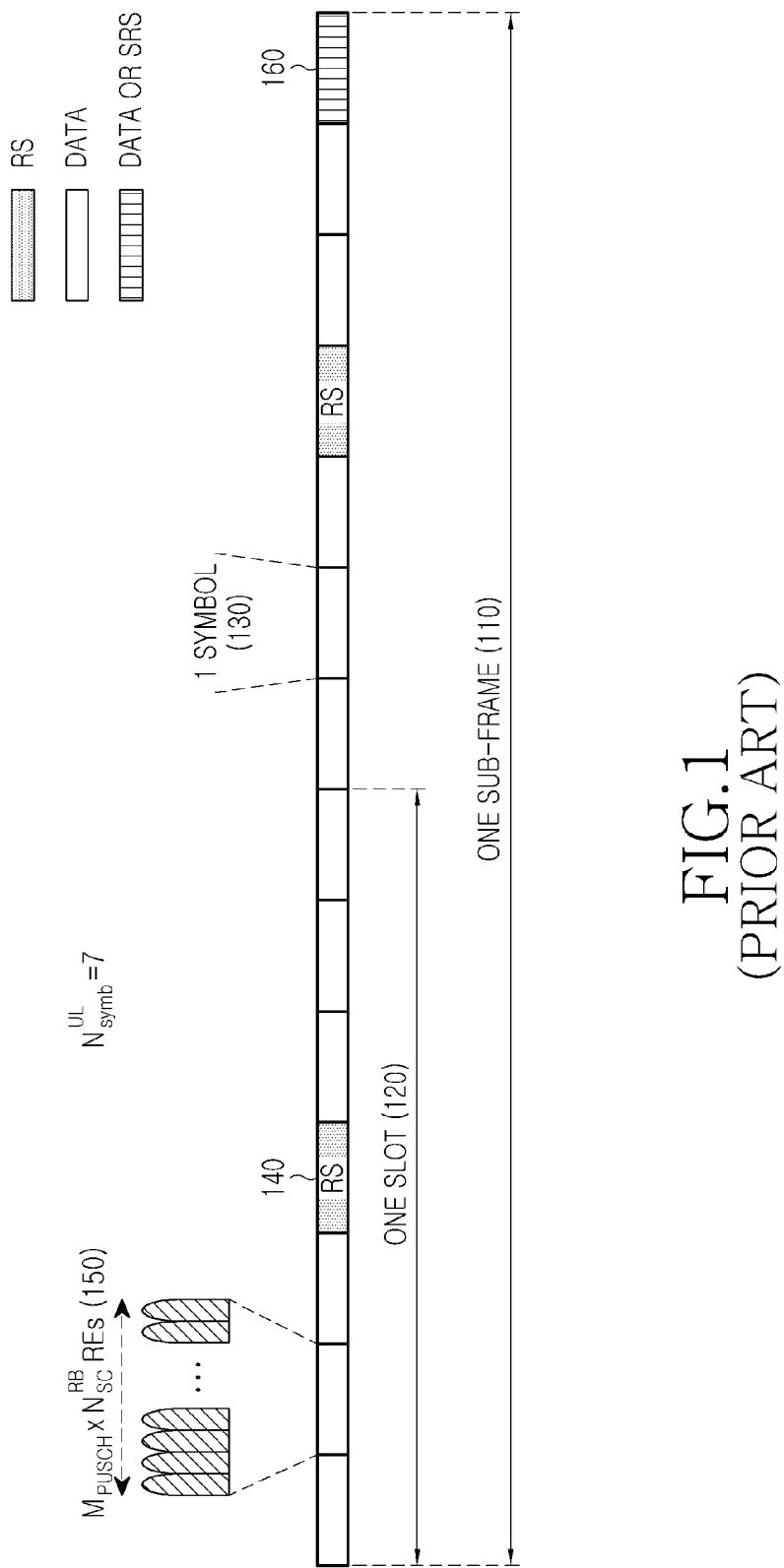
FIG. 1 is a diagram illustrating a UL sub-frame structure for PUSCH transmissions in the UL of the communication system.
Figure 2:
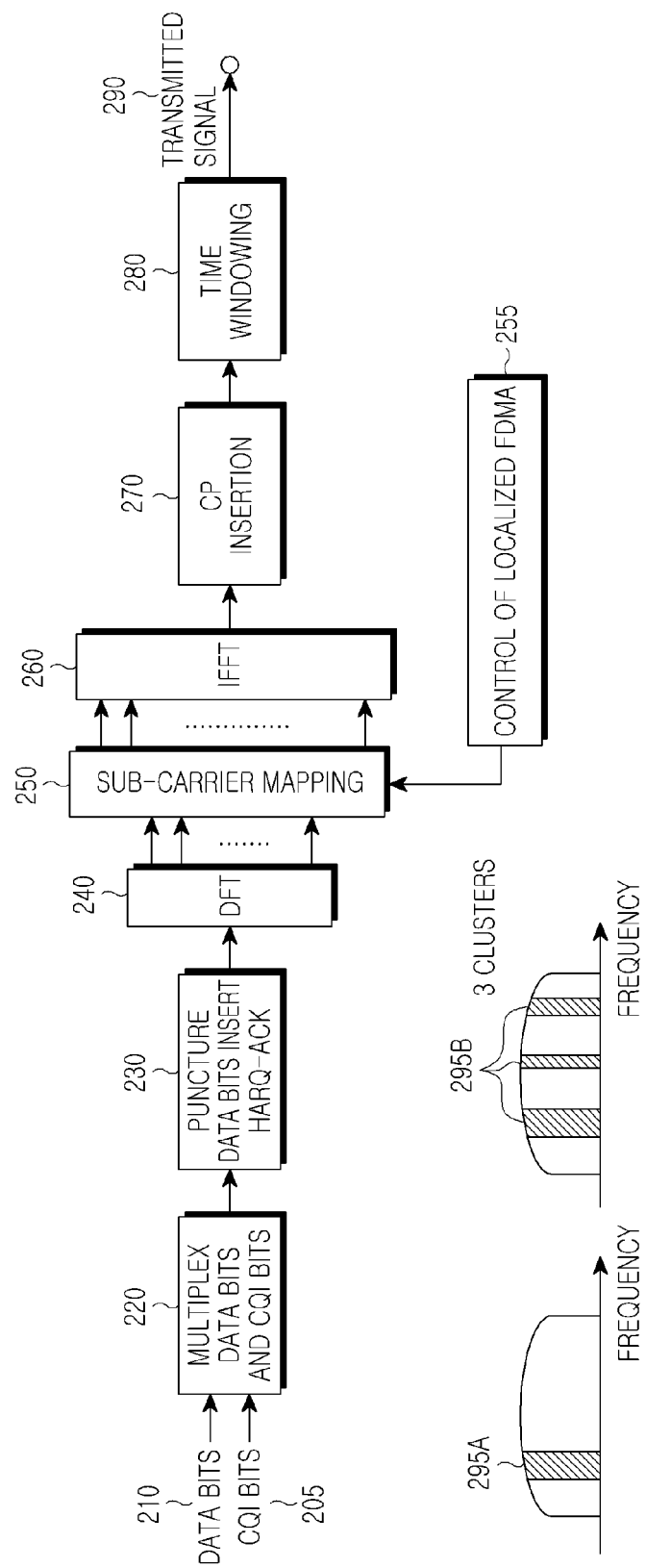
FIG. 2 is a block diagram illustrating a DFT-S-OFDM transmitter.
Figure 3:
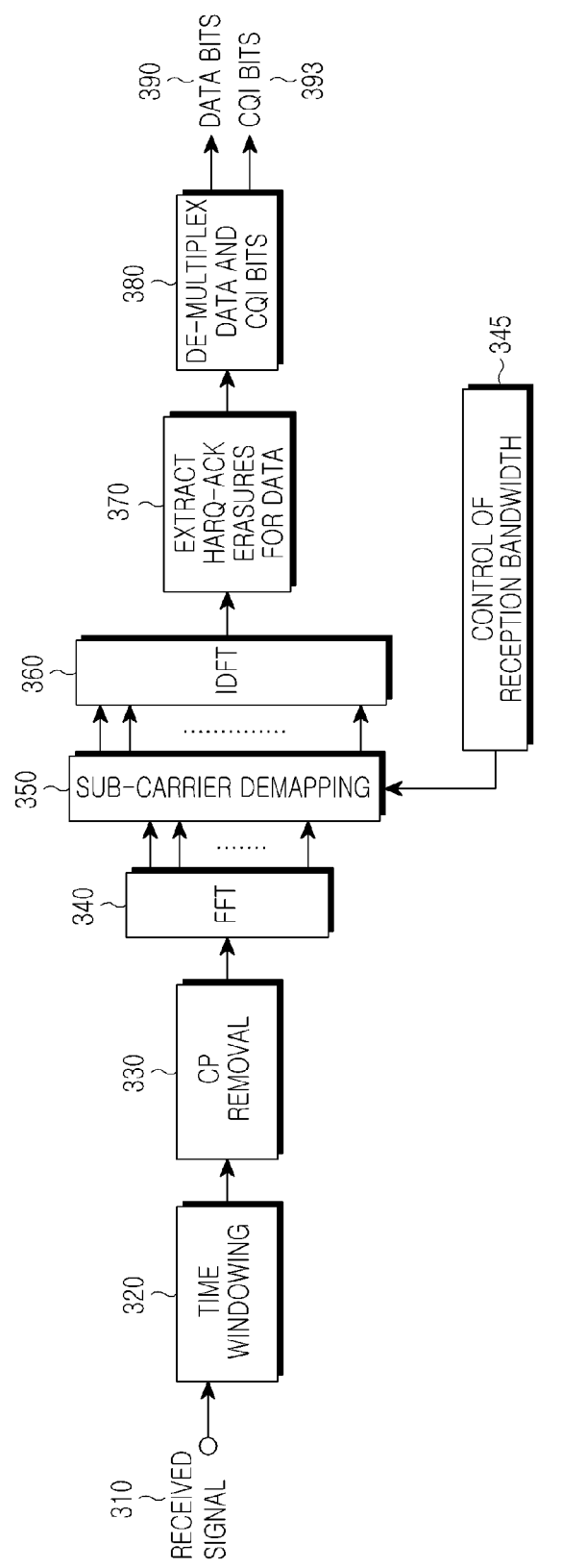
FIG. 3 is a block diagram illustrating a DFT-S-OFDM receiver.
Figure 4:
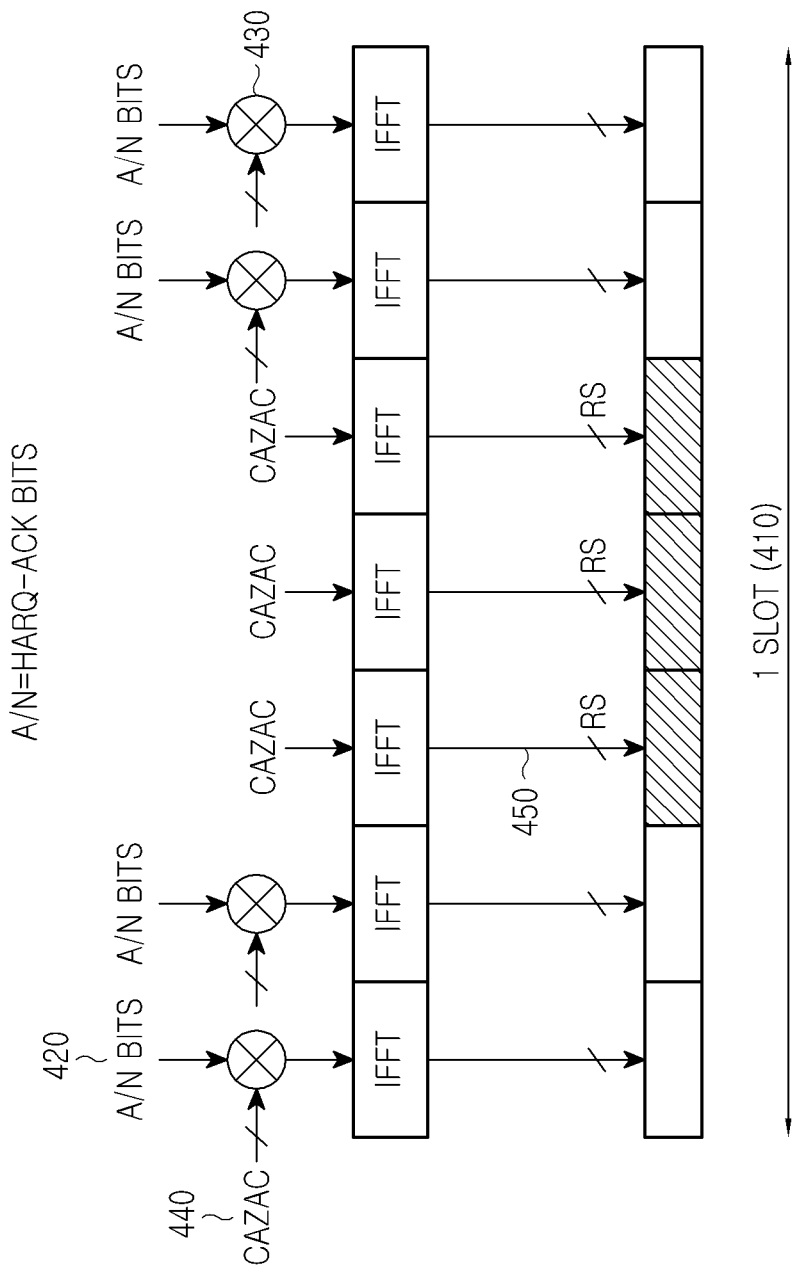
FIG. 4 is a block diagram illustrating a slot structure for HARQ-ACK signal transmission in the PUCCH.
Figure 5:
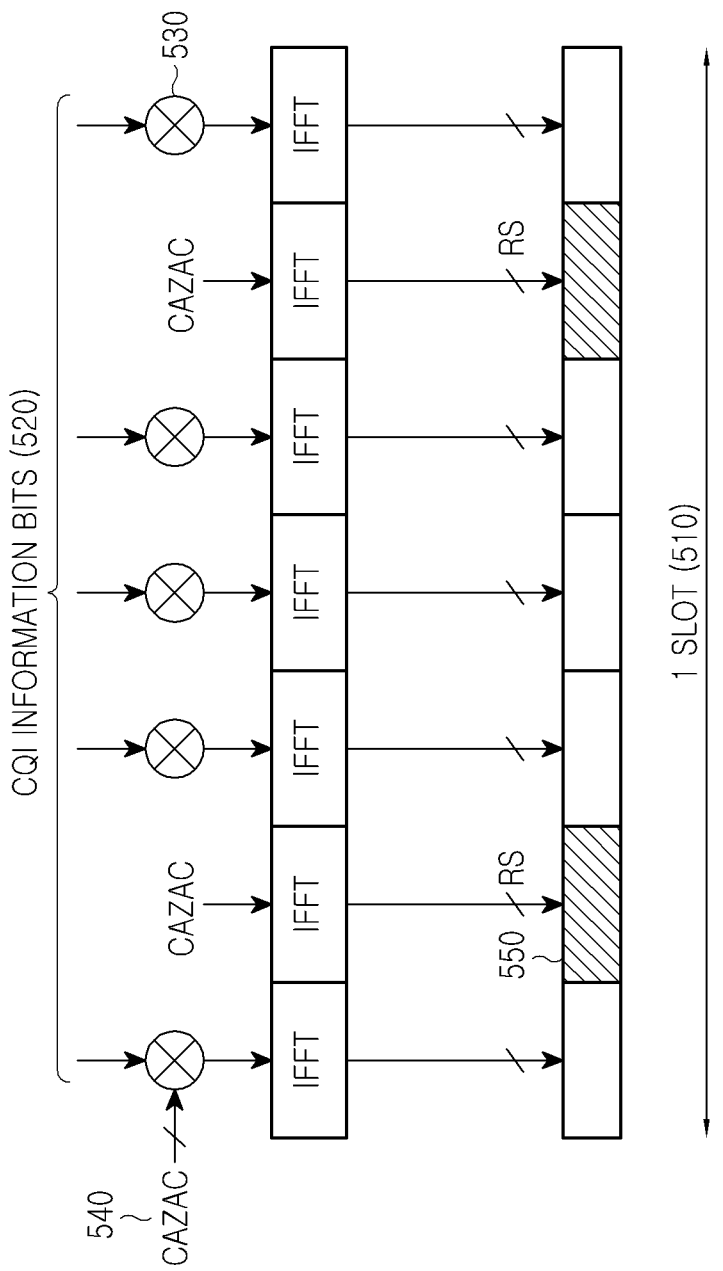
FIG. 5 is a block diagram illustrating a slot structure CQI signal transmission in the PUCCH.
Figure 6:
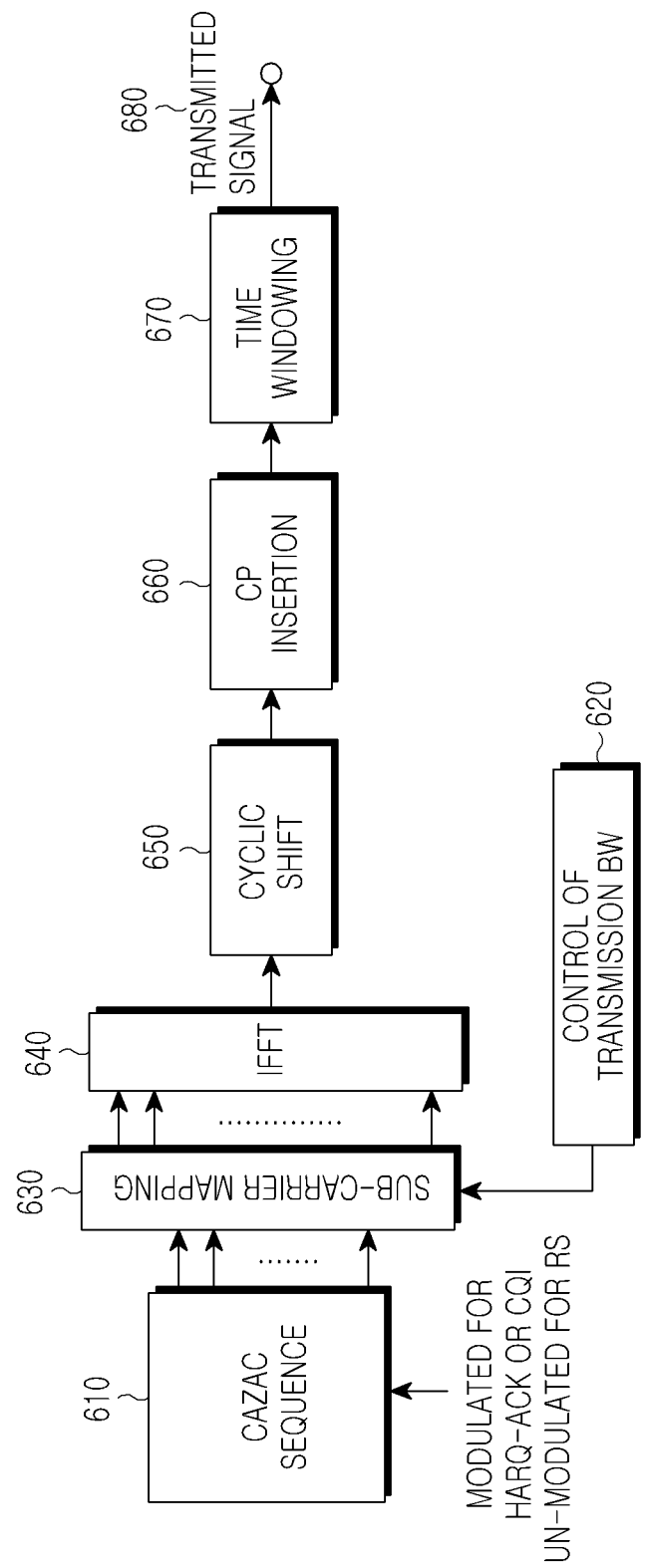
FIG. 6 is a block diagram illustrating a transmitter structure for a CAZAC-based sequence.
Figure 7:
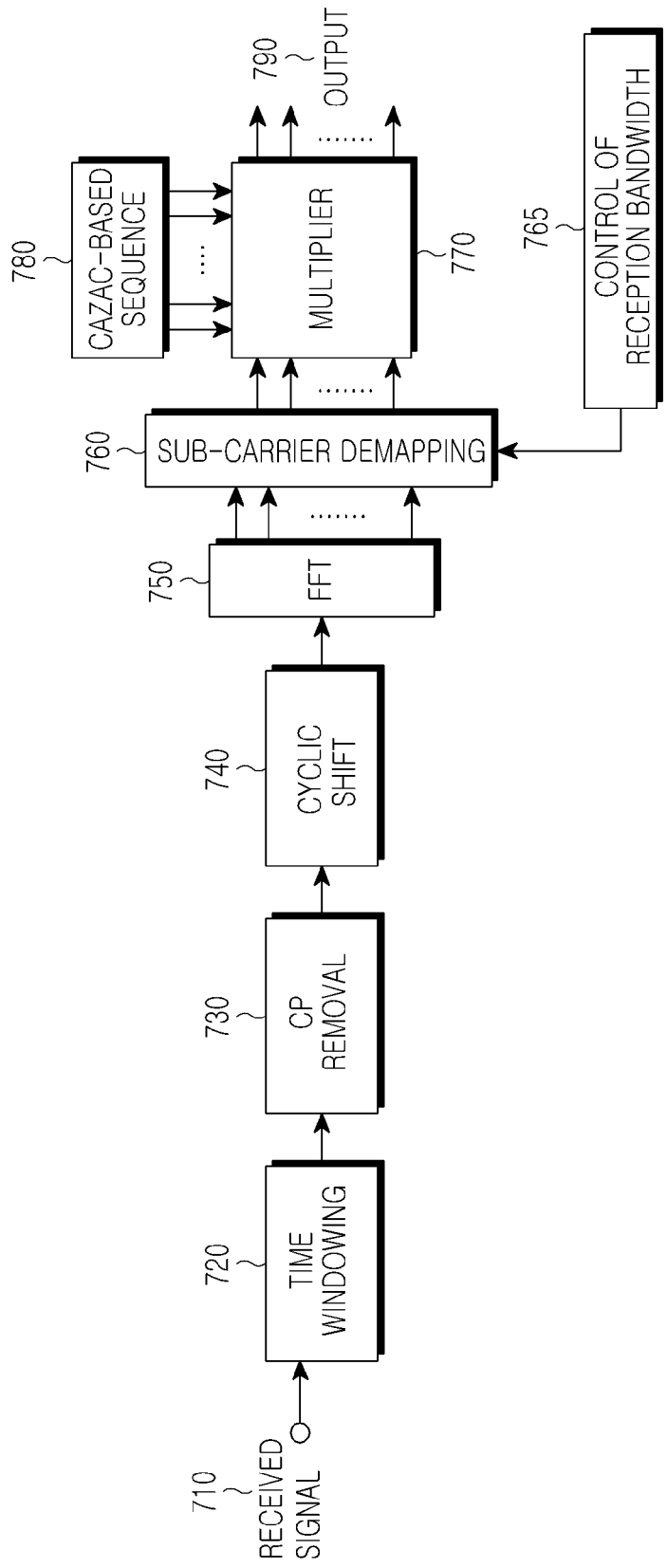
FIG. 7 is a block diagram illustrating a receiver structure for a CAZAC-based sequence.
Figure 8:
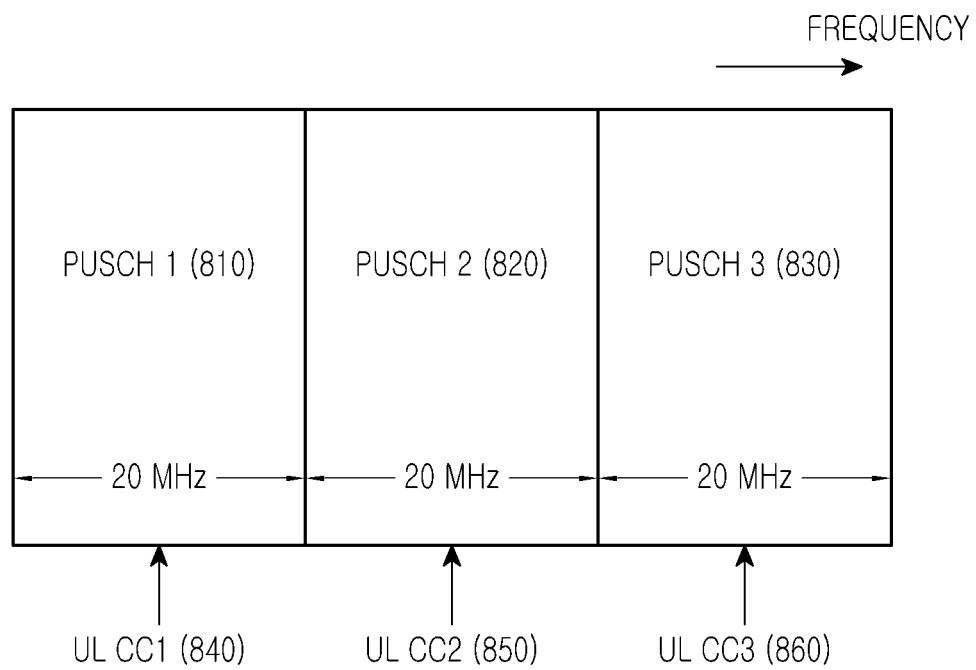
FIG. 8 is a block diagram illustrating UL carrier aggregation.

Hereinafter, various embodiments of the present invention will be described with reference to the accompanying drawings. A detailed description of known functions and configurations incorporated herein will be omitted when it may obscure the subject matter of the present invention.

Although the present invention is described in relation to an Orthogonal Frequency Division Multiple Access (OFDMA) communication system, the present invention may also be applied to all Frequency Division Multiplexing (FDM) systems generally, including Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM.

A first aspect of the invention considers a PUSCH TPC operation for multiple PUSCH transmissions from a UE in a sub-frame in the same UL CC and in multiple UL CCs. According to an embodiment of the present invention, the TPC formula for the PUSCH transmission power in a single CC and over contiguous PRBs also applies, per UL CC, for PUSCH transmission in multiple UL CCs and over contiguous or non-contiguous PRBs. Then, the PUSCH transmission power $P_{PUSCH}$ (i k) from a UE in sub-frame i and UL CC k, k=1, ..., K, is set as $$P_{PUSCH}(i,k)=\min\{P_{MAX}, 10 \cdot \log_{10} M_{PUSCH}(i,k) + P_{0\_PUSCH}(k) + \alpha(k) \cdot PL(k) + \Delta_{TF}(i,k) + f(i,k)\} \text{ [dBm]} \quad (4)$$

subject to $$\sum_{k=1}^{K} P_{PUSCH}(i,k) \le P_{MAX}$$

where
  $M_{PUSCH}(i,k)$ is the number of, contiguous or non-contiguous, PRBs for PUSCH transmission in UL CC k.
  $P_{0\_PUSCH}(k)$ controls the mean received SINR at the Node B and is the sum of a cell-specific component $P_{O\_NOMINAL\_PUSCH}(k)$ and a UE-specific component $P_{O\_UE\_PUSCH}(k)$, which are provided to the UE by RRC.
  $\alpha(k)$ is a cell-specific parameter provided by RRC for UL CC k with $0 \le \alpha(k) \le 1$.
  PL(k) is the DL path-loss estimate from the serving Node B as calculated at the UE and applied to UL CC k.
  $\Delta_{TF}(i,k)=10 \cdot \log_{10}(2^{K_s(k) \cdot TBS(i,k)/N_{RE}}(i,k)-1)$ where $K_s(k)$ is a parameter provided by RRC in UL CC k TBS(i, k) is the TB size, and $N_{RE}(i,k)=M_{PUSCH}(i,k) \cdot N_{sc}^{RB} \cdot N_{symb}^{PUSCH}(i,k)$.
  $f(i,k)=f(i-1,k)+\delta_{PUSCH}(i, k)$ is the function accumulating the CL TPC command $\delta_{PUSCH}(i,k)$ during sub-frame i with f(0,k) being the first value after reset of accumulation. If the PUSCH transmission in UL CC k is configured through a SA, the CL TPC command $\delta_{PUSCH}(i, k)$ is included in that SA. Otherwise, a TPC channel in the PDCCH informs the UE of the CL TPC command $\delta_{PUSCH}(i,k)$.

While the TPC formula in Equation (4) is a generalization of the TPC formula for PUSCH transmission in a single UL CC in Equation (1), Equation (4) raises several issues including:

a) whether to define UL CC specific parameters,
b) how the UE performs UL CC specific DL path-loss measurements and accumulation of CL TPC commands, and
c) how to allocate the power for PUSCH transmissions in multiple UL CCs in case $P_{MAX}$ is reached before the PUSCH transmission in each UL CC is allocated its target power.

Regarding the definition of UL CC specific parameters, direct extension of all parameters to CC-specific values or the following restrictions may be considered:

$P_{0\_PUSCH}(k)$: The cell-specific component $P_{O\_NOMINAL\_PUSCH}(k)$ may be common to all UL CCs while the UE-specific component $P_{O\_UE\_PUSCH}(k)$ may be different for each UL CC.

$\alpha(k)$ is a cell-specific parameter provided by RRC for each UL CC k.

$K_s(k)$ in $\Delta_{TF}(i, k)$ may be common to all UL CCs a UE is configured since either adaptive MCS selection applies to all UL CCs ($K_s=0$) or to none of them (for example, $K_s=1.25$).

Regarding the UL CC specific DL path-loss measurements and accumulation of the CL TPC commands at the UE, the following restrictions may be considered:

PL(k): Path-loss measurements on each UL CC are not needed for BW contiguous UL CCs but are needed for BW non-contiguous UL CCs. Since it is desirable for the UE functionality to not differentiate between the cases of BW contiguous and BW non-contiguous UL CCs, path-loss measurements on multiple UL CCs are supported. Moreover, each UE can be configured an UL CC which is linked to a DL CC where the UE performs the path-loss measurement. The UE uses that UL CC to report the path-loss measurement. The Node B informs each UE through RRC whether additional path-loss measurements need to be performed for the remaining UL CCs a UE is configured, which are linked to respective DL CCs. The Node B may also inform the UEs of the path-loss measurement reporting rate.

f(i,k): Accumulation of CL TPC commands each UL CC k is always performed in the same manner as PUSCH transmission in a single UL CC. However, in case of PUSCH transmissions in multiple UL CCs or in case of concurrent PUCCH transmissions, $P_{MAX}$ may be reached before each channel is allocated its nominal transmission power. Then, as it is subsequently discussed, the transmission power of the various channels is reduced. This reduction may lead to the suspension of PUSCH transmission in an UL CC. In such case, CL TPC commands are always accumulated in each respective UL CC even when a respective PUSCH transmission is suspended.

Regarding the PUSCH transmission power allocation among multiple UL CCs when $P_{MAX}$ is reached before the PUSCH transmission in each UL CC is allocated its nominal power according Equation (4), one option is to reduce the PUSCH transmission power in each UL CC by the same amount so that the total transmission power does not exceed $P_{MAX}$. However, this reduction option effectively penalizes PUSCH transmissions of higher Spectral Efficiency (SE) more than this reduction option penalizes PUSCH transmissions with lower SE, and therefore, this option is detrimental. Additionally, this reduction option may lead to the suspension of PUSCH transmissions having a low nominal power.

Embodiments according to the present invention consider that the same amount of power reduction is applied only to PUSCH transmissions in non-contiguous BWs in the same UL CC, which are assumed to have the same SE (or MCS). PUSCH transmissions in different UL CCs are allowed to have different SEs (or MCSs) and two approaches are subsequently described herein for adjusting the transmission power when the total UE transmission power exceeds $P_{MAX}$. The same principle applies in each of the two approaches. For some PUSCH transmissions, it is possible to avoid any power reduction while, for the remaining PUSCH transmissions, the adjusted power is proportional to the SINR or to the nominal transmission power.

The first approach considers that the amount of allocated power is proportional to the SINR of the PUSCH transmission. The SE in UL CC k can be expressed as the ratio $TBS(i,k)/N_{RE}(i,k)$ providing the number of coded information bits per RE. Then, the Shannon capacity formula is applied according to Equation (5), $$SE(i, k) = \frac{TBS(i, k)}{N_{RE}(i, k)} \qquad (5)$$
$$= \log_2(1 + SINR(i, k))/f$$
$$= \log_2\left(1 + \frac{P_{PUSCH}(i, k)}{(I+N)(i, k)}\right)/f$$

where f is a normalizing factor such as $K_s$ and $(I+N)(i, k)$ is the sum of interference and noise power in UL CC k. Therefore, $$SINR(i, k) = 2^{\frac{TBS(i,k)}{N_{RE}(i,k)} \cdot f} - 1 \text{ or,}$$

by approximation, $$SINR(i, k) \approx 2^{\frac{TBS(i,k)}{N_{RE}(i,k)} \cdot f}$$

as the SINR for UEs scheduled PUSCH transmissions in multiple UL CCs is typically sufficiently larger than 1 (in the linear domain). When the nominal PUSCH transmission power according to Equation (4) cannot be allocated in any respective UL CC, in order to obtain a proportional reduction to the SINR, the PUSCH transmission power in UL CC k is derived according to Equation (6):

$$P_{PUSCH}^{adjust}(i, k) = \qquad (6)$$
$$\min\left(P_{PUSCH}(i, k), P_{MAX} \cdot \left(2^{\frac{TBS(i,k)}{N_{RE}(i,k)} \cdot f} \bigg/ \sum_{k=1}^{K} 2^{\frac{TBS(i,k)}{N_{RE}(i,k)} \cdot f}\right)\right).$$

A procedure for allocating the power to PUSCH transmissions in multiple UL CCs, when the total nominal transmission power exceeds $P_{MAX}$, includes the following steps:

a) Determine the UL CCs, if any, for which $$P_{PUSCH}(i, k) < P_{MAX} \cdot \left(2^{\frac{TBS(i,k)}{N_{RE}(i,k)} \cdot f} \bigg/ \sum_{k=1}^{K} 2^{\frac{TBS(i,k)}{N_{RE}(i,k)} \cdot f}\right) \qquad (7)$$

and create a set J with the respective indexes, $J=\{1, \ldots, J_0\}$. In these UL CCs, the PUSCH transmission power remains unchanged and is as described in Equation (4).

b) For the remaining UL CCs, $k \in \{1, \ldots, K\}$, $k \notin J$, the PUSCH transmission power is determined according to Equation (8):

$$P_{PUSCH}^{adjust}(i,k) = \min\left(P_{PUSCH}(i,k), \right. \tag{8}$$

$$\left.\left(P_{MAX} - \sum_{j=1}^{J_0} P_{PUSCH}(i,j)\right) \cdot \left(2^{\frac{TBS(i,k)}{N_{RE}(i,k)} \cdot f} \middle/ \sum_{\substack{k=1 \\ k \notin J}}^{K} 2^{\frac{TBS(i,k)}{N_{RE}(i,k)} \cdot f}\right)\right).$$

The preceding procedure ensures, that in an UL CC where the nominal PUSCH transmission power is lower than the respective transmission power in Equation (6), the nominal PUSCH transmission power is applied according Equation (4) and the sum of nominal PUSCH transmission powers is subtracted from $P_{MAX}$ prior to adjusting the power of PUSCH transmissions in the remaining UL CCs.

Moreover, the above procedure may be implemented in an iterative fashion, wherein the second step b) is further divided into 2 sub-steps, where in the first sub-step the UL CCs for which $P_{PUSCH}^{adjust}(i,k) = P_{PUSCH}(i,k)$ are identified, if any, another set $J^1 = \{1, \ldots, J_0^1\}$ with the respective indexes is created. In the second sub-step, Equation (8) is further refined as Equation (9):

$$P_{PUSCH}^{adjust}(i,k) = \tag{9}$$

$$\min\left(P_{PUSCH}(i,k), \left(P_{MAX} - \sum_{j=1}^{J_0} P_{PUSCH}(i,j) - \sum_{j_1=1}^{J_0^1} P_{PUSCH}(i,j_1)\right) \cdot \right.$$

$$\left.\left(2^{\frac{TBS(i,k)}{N_{RE}(i,k)} \cdot f} \middle/ \sum_{\substack{k=1 \\ k \notin J, J^1}}^{K} 2^{\frac{TBS(i,k)}{N_{RE}(i,k)} \cdot f}\right)\right).$$

The procedure can continue from the second sub-step in the same iterative manner with two more sub-sub-steps. However, the mechanisms of the first approach are evident from the preceding description and further details are omitted for clarity and conciseness.

An application for the first approach is described as follows. A reference UE is assumed to have $P_{MAX} = 10$, PUSCH transmissions in $K=3$ CCs in sub-frame i, and nominal transmission powers $P_{PUSCH}(i,1)=2$, $P_{PUSCH}(i,2)=3$, and $P_{PUSCH}(i,3)=7$. The values for $$2^{\frac{TBS(i,k)}{N_{RE}(i,k)} \cdot f},$$

$k = 1, 2, 3$ are $2^{\frac{TBS(i,1)}{N_{RE}(i,1)} \cdot f} = 5,$ $2^{\frac{TBS(i,2)}{N_{RE}(i,2)} \cdot f} = 2,$ and $2^{\frac{TBS(i,3)}{N_{RE}(i,3)} \cdot f} = 3.$ Since $\sum_{k=1}^{3} P_{PUSCH}(i,k) = 12 > 10 = P_{MAX},$ the UE applies the previous procedure for the PUSCH transmission power allocation in each CC. From the first step a), the condition in Equation (7) applies only when $k=1$ and the nominal PUSCH transmission power $P_{PUSCH}(i,1)=2$ is assigned. Therefore, the set J contains $k=1$. From the second step b), based on Equation (8), the PUSCH transmission power assigned for $k=2,3$ is respectively $P_{PUSCH}^{adjust}(i,2)=3=P_{PUSCH}(i,2)$ and $P_{PUSCH}^{adjust}(i,3)=24/5=4.8$. The total allocated power is 9.8, which is less than $P_{MAX}=10$. The total allocated power is less than $P_{MAX}$, because the nominal PUSCH transmission power $P_{PUSCH}^{adjust}(i,2)=P_{PUSCH}(i,2)=3$ is allocated instead of $$(P_{MAX} - P_{PUSCH}(i,1)) \cdot \left(2^{\frac{TBS(i,2)}{N_{RE}(i,2)} \cdot f} \middle/ \sum_{k=2}^{3} 2^{\frac{TBS(i,2)}{N_{RE}(i,2)} \cdot f}\right) = 16/5 = 3.2,$$

which would have made the total allocated power equal to $P_{MAX}$. As $P_{PUSCH}^{adjust}(i,3) < P_{PUSCH}(i,3)$ and $P_{PUSCH}(i,1) + P_{PUSCH}(i,2) + P_{PUSCH}^{adjust}(i,3) < P_{MAX}$, it would be desirable to further increase $P_{PUSCH}^{adjust}(i,3)$. This further increase is achieved by the iterative part of the procedure where the set $J^1$ contains $k=2$. Then, Equation (9) provides $P_{PUSCH}^{adjust}(i,3)=5$ (instead of $P_{PUSCH}^{adjust}(i,3)=4.8$ if no iterations were applied). Nevertheless, as previously mentioned, if a simplified PUSCH power allocation process is desired, the iterative steps of the procedure may be omitted.

Figure 9:
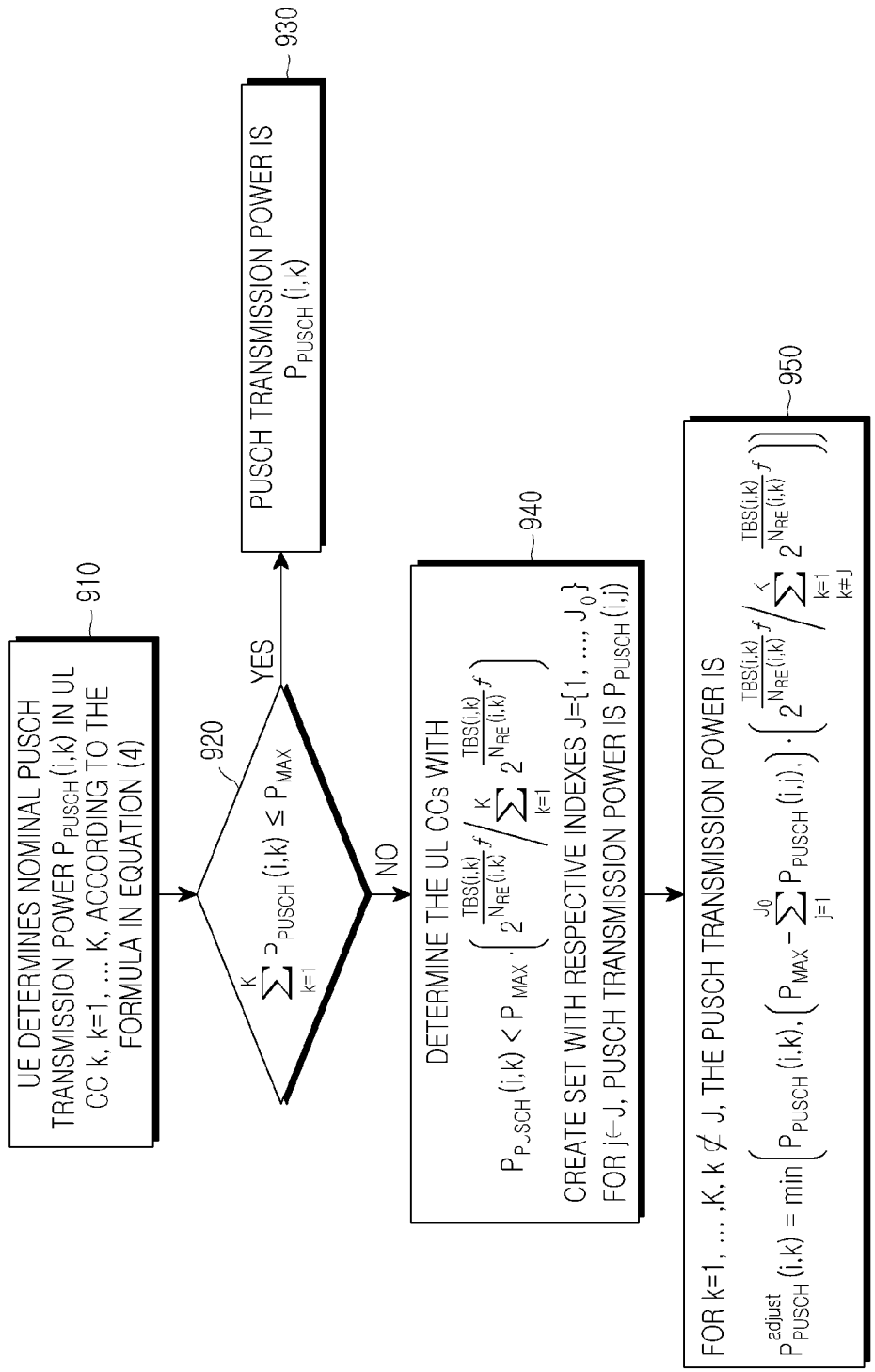
FIG. 9 is a flow diagram illustrating a first method for power allocation to PUSCH transmissions in multiple UL CCs under a limit for the total maximum transmission power according to an embodiment of the present invention.

A PUSCH power allocation using the first approach according to an embodiment of the present invention is illustrated in FIG. 9. Referring to FIG. 9, the UE first determines the nominal PUSCH transmission power $P_{PUSCH}(i,k)$ in each of the UL CCs where the UE has PUSCH transmission in step 910. Subsequently, the UE determines whether the aggregate of the nominal PUSCH transmission powers is less than $P_{MAX}$ in step 920. If the aggregate is less than $P_{MAX}$ is, the PUSCH transmission in an UL CC uses the respective nominal transmission power in step 930. If the aggregate of the nominal PUSCH transmission powers is at least equal to $P_{MAX}$, the UE determines the PUSCH transmissions with $$P_{PUSCH}(i,k) < P_{MAX} \cdot \left(2^{\frac{TBS(i,k)}{N_{RE}(i,k)} \cdot f} \middle/ \sum_{k=1}^{K} 2^{\frac{TBS(i,k)}{N_{RE}(i,k)} \cdot f}\right),$$

creates a set J with the respective UL CC indexes, and transmits PUSCH in those UL CCs using the nominal transmission power in step 940. Finally, the UE subtracts the aggregate power of the PUSCH transmissions corresponding to step 940 from $P_{MAX}$ and computes the PUSCH transmission power in the remaining UL CCs according to $$P_{PUSCH}^{adjust}(i,k) = \min\left(P_{PUSCH}(i,k), \right.$$

$$\left.\left(P_{MAX} - \sum_{j=1}^{J_0} P_{PUSCH}(i,j)\right) \cdot \left(2^{\frac{TBS(i,k)}{N_{RE}(i,k)} \cdot f} \middle/ \sum_{\substack{k=1 \\ k \notin J}}^{K} 2^{\frac{TBS(i,k)}{N_{RE}(i,k)} \cdot f}\right)\right),$$

in step 950. The description can be extended in a straightforward manner to include the iterative step but a detailed description thereof is omitted for clarity and conciseness.

The second approach provides implementation simplicity and similar characteristics as the first approach in the linear range of the Shannon capacity curve and considers that the PUSCH transmission power is proportionally reduced relative to a nominal value according to Equation (10)

$$P^{adjust}_{PUSCH}(i, k) = P_{MAX} \cdot \left(P_{PUSCH}(i, k) \Big/ \sum_{k=1}^{K} P_{PUSCH}(i, k)\right) \quad (10)$$

The procedure to allocate the power to PUSCH transmissions in multiple UL CCs in case the total nominal transmission power exceeds $P_{MAX}$ considers the following steps:

c) Determine the UL CCs, if any, for which $$P_{PUSCH}(i, k) < P_{MAX} \cdot \left(P_{PUSCH}(i, k) \Big/ \sum_{k=1}^{K} P_{PUSCH}(i, k)\right) \quad (11)$$

and create a set J with the respective indexes, $J = \{1, \ldots, J_0\}$. In these UL CCs, the nominal PUSCH transmission power is applied as described in Equation (4).

d) For the remaining UL CCs $k \in \{1, \ldots, K\}$, $k \notin J$, the PUSCH transmission power is determined according to Equation (12):

$$P^{adjust}_{PUSCH}(i, k) = \min\left(P_{PUSCH}(i, k), \right.$$
$$\left. \left(P_{MAX} - \sum_{j=1}^{J_0} P_{PUSCH}(i, j)\right) \cdot \left(P_{PUSCH}(i, k) \Big/ \sum_{\substack{k=1 \\ k \notin J}}^{K} P_{PUSCH}(i, k)\right)\right) \quad (12)$$

Similar to the first approach, the preceding procedure ensures that in UL CCs where the nominal PUSCH transmission power is less than the respective one in Equation (10), the nominal PUSCH transmission power is applied according to Equation (4) and the sum of nominal PUSCH transmission powers is subtracted from $P_{MAX}$ before adjusting each PUSCH transmission power in the remaining UL CCs. Moreover, the preceding procedure may be implemented in an iterative fashion, wherein the second step d) is further divided into 2 sub-steps, wherein in the first sub-step of step d), the UL CCs for which $P^{adjust}_{PUSCH}(i,k) = P_{PUSCH}(j,k)$ are identified, if any, another set $J^1 = \{1, \ldots, J_0^1\}$ with the respective indexes is created, and in the second sub-step of step d) Equation (12) is further refined as Equation (13):

$$P^{adjust}_{PUSCH}(i, k) = \quad (13)$$
$$\min\left(P_{PUSCH}(i, k), \left(P_{MAX} - \sum_{j=1}^{J_0} P_{PUSCH}(i, j) - \sum_{j_1=1}^{J_0^1} P_{PUSCH}(i, j_1)\right) \cdot \right.$$
$$\left. \left(P_{PUSCH}(i, k) \Big/ \sum_{\substack{k=1 \\ k \notin J, J^1}}^{K} P_{PUSCH}(i, k)\right)\right)$$

and continue from the second sub-step in the same iterative manner with two additional sub-sub-steps. Nevertheless, for the first approach, the mechanisms of the second approach are evident from the described procedure and further details are omitted for brevity. Additionally, for both the first approach and the second approach, the first step of the power allocation may be avoided in order to simplify the respective procedure (equivalent to the case that the set J is empty).

Figure 10:
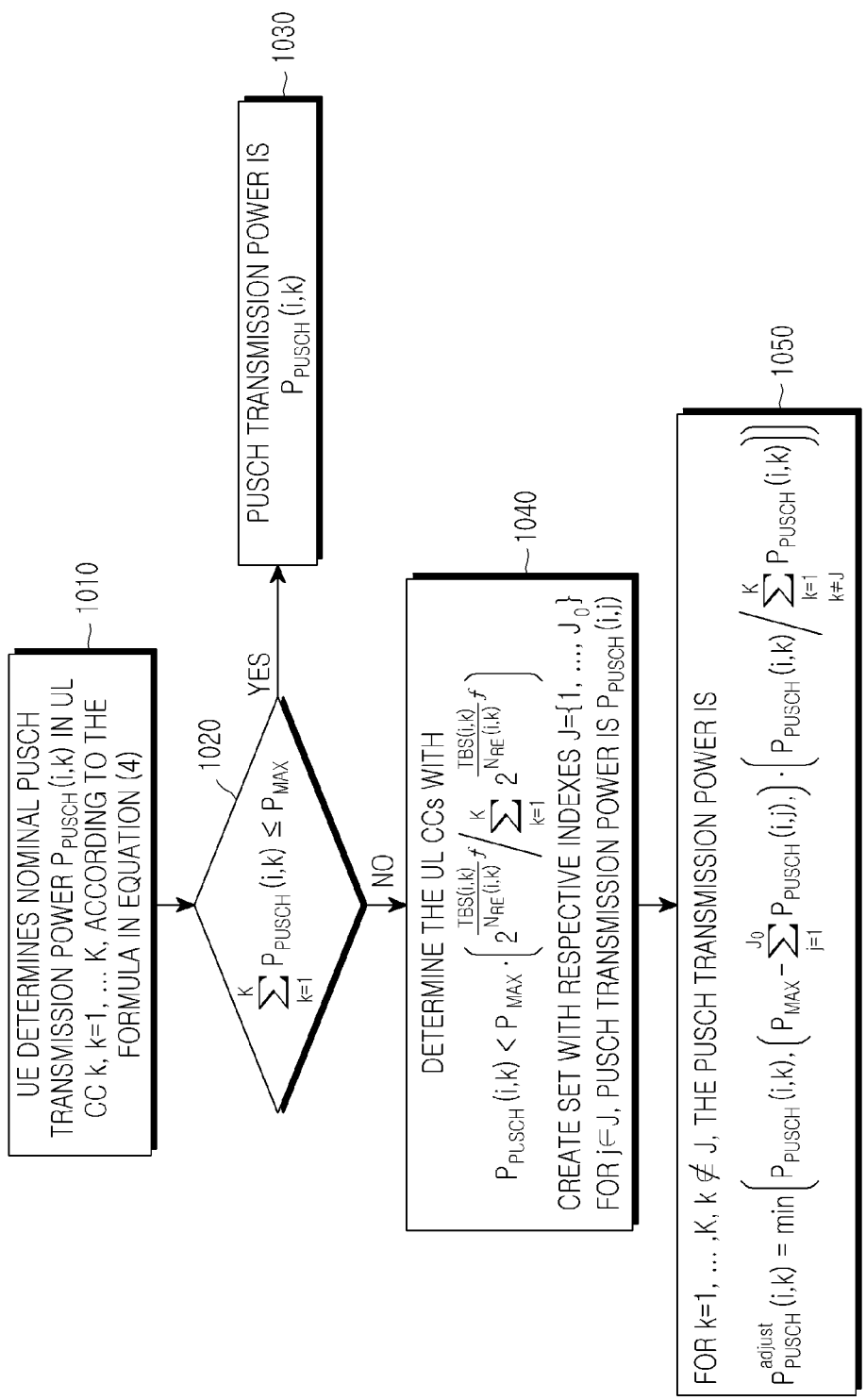
FIG. 10 is a flow diagram illustrating a second method for power allocation to PUSCH transmissions in multiple UL CCs under a limit for the total maximum transmission power according to an embodiment of the present invention.

A PUSCH power allocation using the second approach according to an embodiment of the present invention is illustrated in FIG. 10. Referring to FIG. 10, the UE first determines the nominal PUSCH transmission power $P_{PUSCH}(i,k)$ in each respective UL CC in step 1010. Subsequently, the UE determines whether the aggregate of the nominal PUSCH transmission powers is less than $P_{MAX}$ in step 1020. If the aggregate is less than $P_{MAX}$, the UE transmits its PUSCH in the respective UL CC using the respective nominal transmission power in step 1030. If the aggregate of the nominal PUSCH transmission powers is at least equal to $P_{MAX}$, the UE determines the PUSCH transmissions such that $$P_{PUSCH}(i, k) < P_{MAX} \cdot \left(P_{PUSCH}(i, k) \Big/ \sum_{k=1}^{K} P_{PUSCH}(i, k)\right),$$

creates a set J with the respective UL CCs indexes, and transmits PUSCH in those UL CCs using the nominal transmission power in step 1040. Finally, the UE subtracts the aggregate power of the PUSCH transmissions of step 1040 from $P_{MAX}$ and computes the PUSCH transmission power in the remaining UL CCs as $$P^{adjust}_{PUSCH}(i, k) = \min\left(P_{PUSCH}(i, k), \right.$$
$$\left. \left(P_{MAX} - \sum_{j=1}^{J_0} P_{PUSCH}(i, j)\right) \cdot \left(P_{PUSCH}(i, k) \Big/ \sum_{\substack{k=1 \\ k \notin J}}^{K} P_{PUSCH}(i, k)\right)\right),$$

in step 1050. Similar to the first approach, the second approach can also be extended in a straightforward manner to include the iterative step. However, a detailed description thereof is omitted for clarity and conciseness. Moreover, detailed description of the iterative step regarding the first approach can be used to show the applicability of the procedure in an iterative fashion according to the second approach.

A method according to an embodiment of the present invention also consider that instead of SINRs or nominal transmission powers, the SEs (or the MCSs) can be used as metrics for determining PUSCH transmission power adjustments. Using the SEs of the PUSCH transmissions in UL CCs $k \in \{1, \ldots, K\}$ during sub-frame i as metrics, the PUSCH transmission power in UL CC k can be determined as $$P^{adjust}_{PUSCH}(i, k) = P_{MAX} \cdot \left(SE(i, k) \Big/ \sum_{k=1}^{K} SE(i, k)\right).$$

Using the MCSs of the PUSCH transmissions in UL CCs $k \in \{1, \ldots, K\}$ during sub-frame i as metrics, the PUSCH transmission power in UL CC k can be determined as $$P_{PUSCH}^{adjust}(i, k) = P_{MAX} \cdot \left( MCS(i, k) / \sum_{k=1}^{K} MCS(i, k) \right).$$

The two previously described approaches for the PUSCH power allocation when $P_{MAX}$ is reached assume that none of the PUSCH transmissions contains UCI and that the UE does not have any PUCCH transmissions. When neither of these assumptions holds, a method according to an embodiment of the present invention considers the following modifications to the PUSCH transmission power allocation:

e) The nominal power is used for any PUSCH transmission containing UCI and it is included in the set J. The procedure to determine the power of the remaining PUSCH transmissions remains as previously described. If multiple PUSCH transmissions from a UE contain UCI and their combined transmission power exceeds $P_{MAX}$, PUSCH transmissions with HARQ-ACK are prioritized over ones with other UCI types as it is subsequently described.

f) If the UE also has PUCCH transmissions in the same sub-frame, the nominal power of the PUCCH transmissions is used and included in the set J. The procedure to determine the power of the remaining PUSCH transmissions is the same as the previously described procedure.

Figure 11:
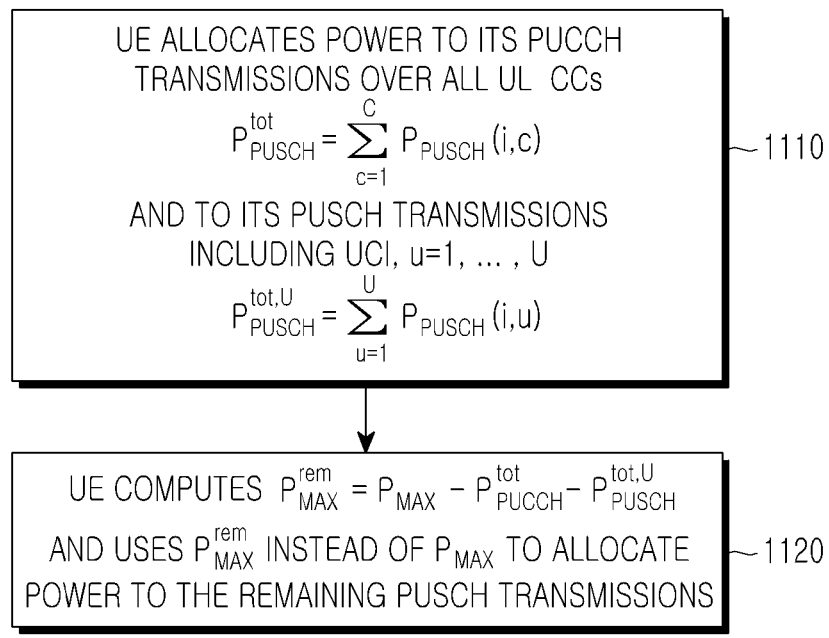
FIG. 11 is a flow diagram illustrating a method for power allocation to simultaneous PUSCH and PUCCH transmissions or to PUSCH transmissions depending on whether the transmissions include UCI under a limit for the total maximum transmission power according to an embodiment of the present invention.

Modifications to the PUSCH transmission power allocation according to an embodiment of the present invention are illustrated in FIG. 11. Referring to FIG. 11, the UE first allocates power to its PUCCH transmissions, if any, over all respective UL CCs including potential multiple PUCCH transmissions in the same UL CC, and to its PUSCH transmissions including UCI, if any. The same UCI is not transmitted in both the PUCCH and the PUSCH in sub-frame i. The total power allocated to C PUCCH transmissions is set according to $$P_{PUCCH}^{tot} = \sum_{c=1}^{C} P_{PUCCH}(i, c)$$

and the total power allocated to U PUSCH transmissions with UCI is set according to $$P_{PUSCH}^{tot,U} = \sum_{u=1}^{U} P_{PUSCH}(i, u)$$

in step 1110. Subsequently, the UE subtracts these total allocated powers from $P_{MAX}$ and uses $P_{MAX}^{rem} = P_{MAX} - P_{PUCCH}^{tot} - P_{PUSCH}^{tot,U}$ instead of $P_{MAX}$ to allocate power in the remaining PUSCH transmissions, if any, in step 1120.

The PUSCH transmissions can be ranked in consideration of the presence of UCI, and the ranking can also extend in general to the UL CCs of the PUSCH transmission. For example, a UE can be configured by the Node B the UL CCs $k \in \{1, \ldots, K\}$ in order of significance, thereby ranking the UL CCs and having a primary UL CC, a secondary UL CC, etc., or this ranking can be in order of SINR, SE, MCI, or UCI type. For simplicity, the value of k now refers to the ranking of the UL CC for a particular UE, but not to the actual physical ordering of an UL CC with respect to the other UL CCs. Then, the PUSCH transmission power adjustment procedure starts from the L CC with the lowest rank and determines the respective adjustment to the PUSCH transmission power as $$P_{PUSCH}^{adjust}(i, K) = P_{MAX} - \sum_{k=1}^{K-1} P_{PUSCH}(i, k).$$

If $P_{PUSCH}^{adjust}(i, K)$ is not negative, the PUSCH power adjustment process terminates and the PUSCH in each remaining UL CC $k \in \{1, \ldots, K-1\}$ is allocated the respective nominal transmission power. If $P_{PUSCH}^{adjust}(i,K)$ is negative, PUSCH transmission in UL CC K is suspended and the PUSCH transmission power adjustment process continues to UL CC K−1. Then, $P_{PUSCH}^{adjust}(i, K-1)$ is determined according to $$P_{PUSCH}^{adjust}(i, K-1) = P_{MAX} - \sum_{k=1}^{K-2} P_{PUSCH}(i, k).$$

Similarly, if $P_{PUSCH}^{adjust}(i, K-1)$ is not negative, the PUSCH transmission power adjustment process terminates and the PUSCH in each of the remaining UL CCs $k \in \{1, \ldots, K-2\}$ is allocated the respective nominal transmission power. If $P_{PUSCH}^{adjust}(i, K-1)$ is negative, PUSCH transmission in UL CC K−1 is also suspended and the PUSCH transmission power adjustment process continues to UL CC K−2 in the same manner. In general, the PUSCH power adjustment process terminates at UL CC $k_1 > 1$ with $$P_{PUSCH}^{adjust}(i, k_1) = P_{MAX} - \sum_{k=1}^{k_1-1} P_{PUSCH}(i, k) \geq 0$$

where $k_1$ is the largest UL CC index satisfying the previous condition and, if $k_1 < K$, the PUSCH transmission in UL CCs $k \in \{k_1+1, \ldots, K\}$ is suspended. If $k_1 = 1$, the PUSCH transmission occurs only in the primary CC with $P_{PUSCH}^{adjust}(i,1) = P_{MAX}$ and it is suspended in all other UL CCs.

The TPC formula for the PUCCH transmission power from a UE in a single CC and over contiguous PRBs also applies, per UL CC, for PUCCH transmission in multiple UL CCs and over contiguous or non-contiguous PRBs. Then, the PUCCH transmission power $P_{PUCCH}(i,k)$ from a UE in sub-frame i and UL CC k is set according to Equation (14):

$$P_{PUCCH}(i,k) = \min\{P_{MAX}, P_{O\_PUCCH}(k) + PL(k) + h(\cdot) + \Delta_{F\_PUCCH}g(i,k)\} \text{ [dBm]} \quad (14)$$

subject to $$\sum_{k=1}^{K} P_{PUCCH}(i, k) \leq P_{MAX}$$

where $P_{O\_PUCCH}(k)$ controls the mean received SINR at the Node B and is the sum of a cell-specific component $P_{O\_NOMINAL\_PUCCH}$ (k) and a UE-specific component $P_{O\_UE\_PUCCH}(k)$ which are provided to the UE by RRC. $g(i,k)=g(i-1, k)\pm\delta_{PUCCH}(i,k)$ is a function accumulating the CL TPC command $\delta_{PUCCH}(i,k)$ in the PDCCH TPC channel or in the SA configuring the PDSCH reception for UL CC k in sub-frame i.

The parameters h(•) and $\Delta_{F\_PUCCH}$ are the same as for a single PUCCH transmission in a single UL CC, while PL(k) is defined for the PUSCH transmission in UL CC k.

While the TPC formula in Equation (10) is a generalization of the TPC formula for a single PUCCH transmission in a single UL CC in Equation (2), the same issues as the issues for PUSCH transmissions in multiple UL CCs are raised including:

a) whether to define UL CC specific parameters,
b) how the UE performs UL CC specific DL path-loss measurements and accumulation of CL TPC commands, and
c) how allocate PUCCH transmission power in multiple UL CCs in case $P_{MAX}$ is reached before the PUCCH transmission in each UL CC is allocated its target transmission power.

Regarding the definition of UL CC specific parameters, direct extension of all parameters to CC-specific values or the following restrictions may be considered:

$P_{0\_PUCCH}$ (k): The cell-specific component $P_{O\_NOMINAL\_PUCCH}(k)$ may be common for all UL CCs while the UE-specific component $P_{O\_UE\_PUCCH}(k)$ may be different for each UL CC.

Regarding the path-loss measurements and the accumulation of CL TPC commands at the UE, the following may be considered:

PL(k): The aspects for DL path-loss measurements are the same as corresponding aspects for the PUSCH TPC operation.

g(i,k): Accumulation of CL TPC commands in each UL CC k is performed in the same manner as for PUCCH transmission in a single UL CC. However, in case of PUCCH transmissions in multiple UL CCs, $P_{MAX}$ may be reached before each channel is allocated its nominal transmission power. As it is later discussed, this may result to the suspension of a PUCCH transmission. The invention considers that the CL TPC commands for a respective PUCCH transmission are always accumulated in the respective UL CC even when the transmission is suspended.

Regarding the PUCCH transmission power allocation among multiple UCI signals when $P_{MAX}$ is reached before the nominal PUCCH transmission is allocated in each UCI signal, the invention considers the following principles:

Transmission power for HARQ-ACK signaling is unaffected and is allocated first.
If there are multiple HARQ-ACK channels and $P_{MAX}$ is reached, a proportional decrease in the nominal transmission power is applied as the proportional decrease was previously described according to the second approach for the PUSCH transmission power allocation.

Transmission power for SR signaling is allocated next. SR transmission is always used in the resources of a single UL CC configured to the UE through RRC signaling. If $P_{MAX}$ is reached before the SR signaling is allocated its nominal transmission power, two options exist:
Drop the SR transmission (by default if the power for HARQ-ACK signaling is $P_{MAX}$).
Transmit the SR with reduced power.

As a false positive SR is less detrimental for the overall system operation than a missed/dropped SR, the invention considers the second option. Therefore, the SR transmission power $P_{PUCCH\_SR}^{adjust}(i)$ in sub-frame i in the configured UL CC is given by Equation (15)

$$P_{PUCCH\_SR}^{adjust}(i) = \min\left(P_{PUCCH\_SR}(i), \left(P_{MAX} - \sum_{j=1}^{J_{ACK/NAK}} P_{PUCCH\_HARQ-ACK}(i, j)\right)\right) \quad (15)$$

where $P_{PUCCH\_SR}(i)$ is the nominal, unadjusted, SR transmission power, $P_{PUCCH\_ACK/NAK}(i,j)$ is the HARQ-ACK transmission power in UL CC j and $J_{HARQ-ACK}$ is the total number of UL CCs having HARQ-ACK transmission. When the HARQ-ACK and SR transmissions can be multiplexed in the same channel, as in 3GPP E-UTRA LTE, separate consideration of SR and HARQ-ACK transmissions is not needed.

Transmission power for CQI signaling is allocated next. If $P_{MAX}$ is reached before the CQI signaling is allocated its nominal transmission power, two options exist:
Drop the CQI transmission (which is a default if the power for HARQ-ACK and/or SR signaling is $P_{MAX}$).
Transmit CQI with reduced power.

The first option is less detrimental as it is preferable for the UE to conserve power and for the Node B to be informed that a CQI report has been missed/dropped (for example, through detection of the CQI transmission absence) than to receive an incorrect CQI report or to ignore the CQI report. The second option may be preferable when the PUCCH CQI transmission is performed over multiple sub-frames and/or has Cyclic Redundancy Check (CRC) protection. Then, the CQI transmission power $P_{PUCCH\_CQI}^{adjust}(i,k)$ in sub-frame i and UL CC k is given according to Equation (16):

$$P_{PUCCH\_CQI}^{adjust}(i, k) = \min\left(P_{PUCCH\_CQI}(i, k), \left(P_{MAX} - P_{PUCCH\_SR}^{adjust}(i) - \sum_{j=1}^{J_{ACK/NAK}} P_{PUCCH\_ACK/NAK}(i, j)\right)\right) \quad (16)$$

where $P_{PUCCH\_CQI}(i, k)$ is the nominal CQI transmission power. In case of CQI transmissions in multiple UL CCs during sub-frame i, if the total power remaining after the power allocation to HARQ-ACK and/or SR transmission is not sufficient to provide the nominal CQI transmission power in each UL CC, the power allocation follows the same principles as in either of the two approaches for the PUSCH power allocation.

The above principles also apply when UCI is included in the PUSCH. In general, power is allocated with highest priority to a channel with HARQ-ACK signaling, followed by SR signaling, while power for CQI signaling is allocated with the lowest priority.

Figure 12:
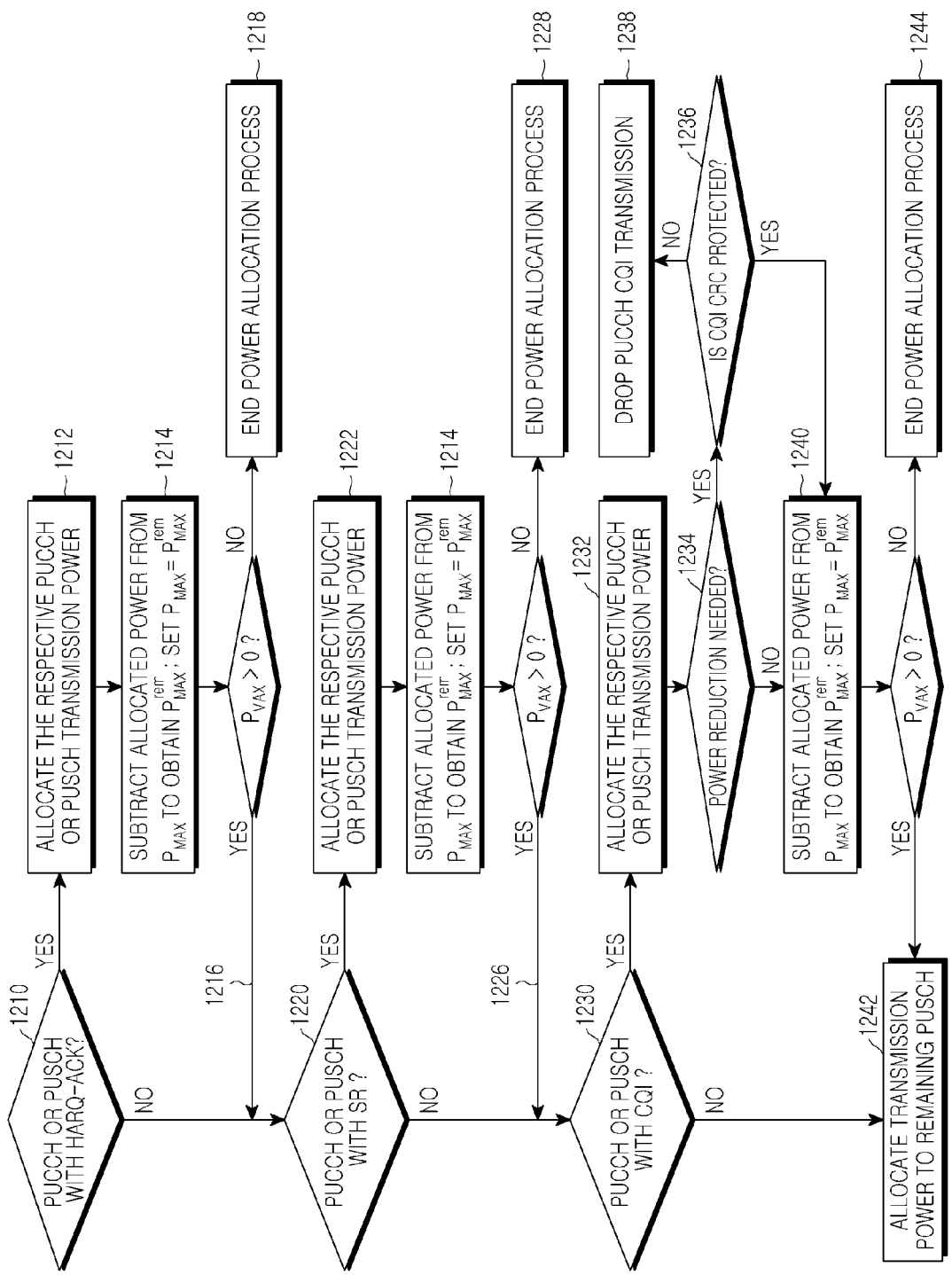
FIG. 12 is a flow diagram illustrating the power allocation to different UCI types under a limit for the total maximum transmission power according to an embodiment of the present invention.

A prioritization of power allocation according to an embodiment of the present invention is illustrated in FIG. 12. Referring to FIG. 12, the existence of HARQ-ACK information for transmission in the reference sub-frame is first determined in step 1210. If there is HARQ-ACK information for transmission either in the PUSCH or in the PUCCH, the respective power is first allocated in step 1212. No reduction in the transmission power is applied unless $P_{MAX}$ is reached, in which case the transmission power of each channel, if more than one, is proportionally reduced as previously described. The allocated power is subtracted from $P_{MAX}$ to obtain a remaining power $P_{MAX}^{rem}$ and, for the subsequent operation of the power allocation procedure, $P_{MAX}^{rem}$ is set to $P_{MAX}$, in step 1214. If $P_{MAX} > 0$, or if there is no HARQ-ACK transmission, the power allocation process continues to step 1216; otherwise, the power allocation process ends in step 1218 and no additional channels are transmitted by the reference UE.

The existence of SR information in the reference sub-frame is subsequently determined in step 1220. If there is SR information for transmission either in the PUSCH or in the PUCCH, the respective power is allocated in step 1222. No reduction in the transmission power is applied unless $P_{MAX}$ is reached (in the method according to FIG. 12 it is assumed that SR is transmitted only through one PUCCH or in a PUSCH as part of data information). The allocated power is subtracted from $P_{MAX}$ to obtain a remaining power $P_{MAX}^{rem}$ and, for the subsequent operation of the power allocation procedure, $P_{MAX}^{rem}$ is set to $P_{MAX}$ in step 1224. If $P_{MAX} > 0$, or if there is no SR transmission, the power allocation process continues in step 1226; otherwise, the power allocation process ends and no additional channels are transmitted by the reference UE in step 1228.

The existence of CQI for transmission in the reference sub-frame is subsequently determined in step 1230. If there is CQI for transmission either in the PUSCH or in the PUCCH, the respective power is allocated in step 1232. No reduction in the transmission power is applied unless $P_{MAX}$ is reached. If it is determined that power reduction is needed in step 1234, the UE determines whether the CQI transmission is CRC protected in step 1236. If the CQI transmission is not CRC protected, the CQI transmission in the PUCCH is dropped in step 1238. If there is CRC protection, or if the CQI transmission is in the PUSCH, the allocated power is subtracted from $P_{MAX}$ to obtain a remaining power $P_{MAX}^{rem}$ and, for the subsequent operation of the power allocation procedure, $P_{MAX}^{rem}$ is set to $P_{MAX}$ in step 1240. If $P_{MAX} > 0$ or if there is no CQI transmission, the power allocation process continues in step 1242; otherwise, the power allocation process ends and no additional channels are transmitted by the reference UE in step 1244.

The TPC formula for the power of the SRS transmission from a UE in a single CC can also be applied, per UL CC, for SRS transmission in multiple UL CCs. Then, the SRS transmission power $P_{SRS}(i, k)$ from a UE in sub-frame i and UL CC k is set according to Equation (17)

$$P_{SRS}(i,k) = \min\{P_{MAX}, P_{SRS\_OFFSET}(k) + 10 \cdot \log_{10} M_{SRS}(k) + P_{0\_PUSCH}(k) + \alpha(k) \cdot PL(k) + f(i,k)\} \text{ [dBm]} \quad (17)$$

subject to $$\sum_{k=1}^{K} P_{SRS}(i, k) \le P_{MAX}$$

where $P_{SRS\_OFFSET}(k)$ controls the mean received SINR at the Node B and is provided to the UE by RRC signaling.

$M_{SRS}(k)$ is the SRS transmission BW, in PRBs, in UL CC k.

The remaining parameters are as defined for PUSCH transmission in UL CC k.

The TPC formula in Equation (17) is a generalization of the formula in Equation (3). However, even though $P_{SRS\_OFFSET}$ is a UE-specific parameter, $P_{SRS\_OFFSET}$ may be separately configured in each UL CC, since the Power Spectral Density (PSD) of the SRS transmission tracks the PSD of the PUSCH transmission. Also, the parameter $P_{0\_PUSCH}(k)$ can be configured in each UL CC and the SRS transmission BW, as defined by a number of PRBs, can differ among UL CCs (for example, the PUCCH size or SRS multiplexing capacity may differ among UL CCs or the UL CCs may have different BW) and the value of $M_{SRS}(k)$ can depend on the UL CC k.

Regarding the SRS transmission power allocation in multiple UL CCs when $P_{MAX}$ is reached before the nominal SRS transmission power is allocated in each UL CC, the same approaches as the approaches described for the PUSCH transmission can be followed, such that, for the first approach, $M_{SRS}(k)$ replaces $SE(i,k)$ and Equation (8) is modified as Equation (18):

$$P_{SRS}^{adjust}(i, k) = \min\left(P_{SRS}(i, k), \left(P_{MAX} - \sum_{j=1}^{J_0} P_{SRS}(i, j)\right) \cdot \left(M_{SRS}(k) \bigg/ \sum_{\substack{k=1 \\ k \notin J}}^{K} M_{SRS}(k)\right)\right), \quad (18)$$

while Equation (12) applies as is with $P_{SRS}$ replacing $P_{PUSCH}$.

The TPC operation can be extended to multiple UE transmitter antennas wherein each antenna, $m \in \{1, \ldots, M\}$, has its own Power Amplifier (PA). Since the extensions of the TPC operation for the PUCCH and SRS are straightforward, for clarity and conciseness, the TPC extension operation for only for the PUSCH is described as follows.

Each UE transmitter antenna may have a different class of PA and therefore $P_{MAX}$ may depend on the UE antenna. Furthermore, due to its position, each antenna may experience a different path loss, and therefore a respective measurement is required for each antenna. The remaining parameters in the TPC formula are the same for all antennas. For UE transmitter antenna m, the TPC formula for the PUSCH transmission power in Equation (4) is modified as Equation (19):

$$P_{PUSCH}(i,k,m) = \min\{P_{MAX}(m), 10 \cdot \log_{10} M_{PUSCH}(i,k) + P_{O\_PUSCH}(k) + \alpha(k) \cdot PL(k,m) + \Delta_{TF}(i,k) + f(i,k)\} \text{ [dBm]} \quad (19)$$

where $P_{MAX}(m)$ is the maximum transmission power from UE transmitter antenna m.

$PL(k,m)$ is the DL path-loss estimate as calculated in the UE using antenna m.

The same value for $\alpha(k)$ is assumed for all UE transmitter antennas and the PUSCH is transmitted with the same parameters from all UE transmitter antennas.

Figure 13:
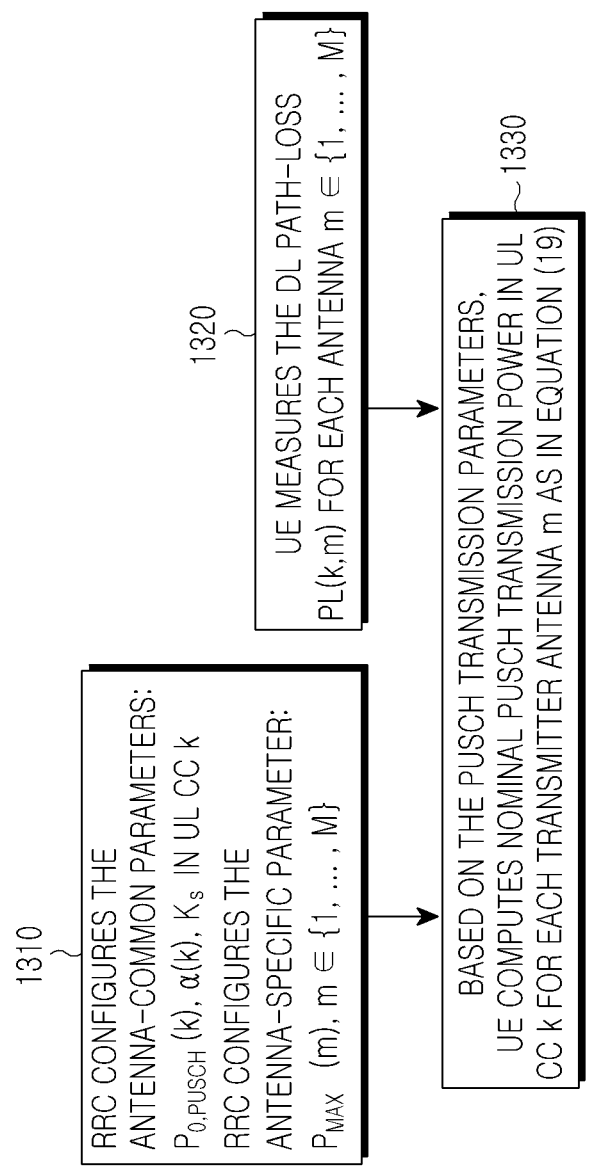
FIG. 13 is a block diagram illustrating an application of transmission power control for multiple UE transmitter antennas with respective multiple power amplifiers according to an embodiment of the present invention.

A TPC operation for multiple UE transmitter antennas according to an embodiment of the present invention is illustrated in FIG. 13. Referring to FIG. 13, RRC configures, to a reference UE, the cell-specific parameter α(k) and the parameters $P_{0,PUSCH}(k)$ and $K_s$ in UL CC k. RRC may also configure, to the UE, the parameter $P_{MAX}(m)$ for each UE transmitter antenna m with a separate PA (m∈{1, . . . , M}) in step 1310. The UE measures the DL path-loss PL(k, m) for transmitter antenna m in step 1320 and, based on the PUSCH transmission parameters in UL CC k, the UE computes the nominal PUSCH transmission power for transmitter antenna m as in Equation (19) in step 1330.

The CL TPC commands can differ for each UE transmitter antenna, since the signal propagation conditions may not be correlated. Therefore, by enabling CL TPC per antenna, the overall TPC operation can be improved and the respective formula for the PUSCH transmission power becomes $$P_{PUSCH}(i,k,m) = \min\{P_{MAX}(m), 10 \cdot \log_{10} M_{PUSCH}(i,k) + P_{0\_PUSCH}(k) + \alpha(k) \cdot PL(k,m) + \Delta_{TF}(i,k) + f(i,k,m)\} \text{ [dBm]} \quad (20)$$

where $f(i,k,m) = f(i-1, k, m) + \delta_{PUSCH}(i,k,m)$ is the function accumulating the CL TPC command $\delta_{PUSCH}(i,k,m)$ for UE transmitter antenna 111 which is included in the PDCCH TPC channel or in the SA configuring the PUSCH transmission in UL CC k during sub-frame i.

Figure 14:
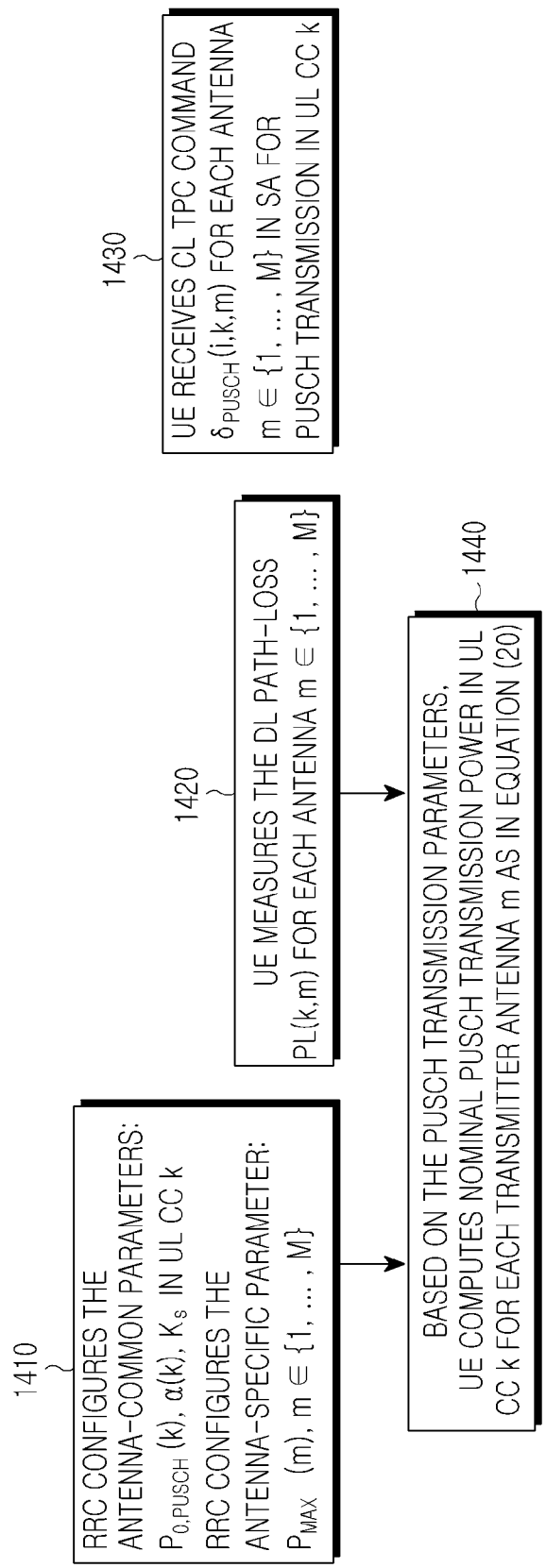
FIG. 14 is a block diagram illustrating an application of different closed loop transmission power control commands for each UE transmitter antenna having its own power amplifier.

A TPC operation with different CL TPC command per UE transmitter antenna m with a separate PA (m∈{1, . . . , M}) according to an embodiment of the present invention is illustrated in FIG. 14. Referring to FIG. 14, RRC configures, to the reference UE, the parameters $P_{0,PUSCH}(k)$, $K_s$ and α(k) in UL CC k and the parameter $P_{MAX}(m)$ for each UE transmitter antenna m in step 1410. The UE measures the DL path-loss PL(k, m) for each transmitter antenna m in step 1420. The UE receives the CL TPC commands for each transmitter antenna m in the SA configuring the PUSCH transmission parameters (or in a PDCCH TPC channel) in step 1430. Based on the PUSCH transmission parameters in UL CC k, the UE computes the nominal PUSCH transmission power for transmitter antenna m as in Equation (20) in step 1440.

While the present invention has been shown and described with reference to certain preferred embodiments thereof, the present invention is not limited to these embodiments. Further, it will be understood by those skilled in the art that various changes in form and details may be made therein without departing from the spirit and scope of the present invention as defined by the appended claims.

What is claimed is:

1. A method for wireless communication by a user equipment (UE), comprising:
   determining a first power for transmitting both first data and control information on a first physical uplink shared channel (PUSCH);
   determining a second power for transmitting second data on a second PUSCH;
   reducing the second power if a sum of the determined first power and the determined second power exceeds a predetermined value; and
   transmitting the first data and the control information on the first PUSCH using the determined first power, and transmitting the second data on the second PUSCH using the reduced second power.

2. The method of claim 1, wherein the reduced second power is less than or equal to a value obtained by subtracting the first power from the predetermined value.

3. The method of claim 1, wherein the predetermined value is a maximum power allowed for the UE.

4. The method of claim 1, wherein the control information comprises at least one of a Hybrid Automatic Repeat reQuest ACKnowledgment (HARQ-ACK) and channel quality information.

5. The method of claim 1, wherein the first and second PUSCHs are transmitted in respective component carriers.

6. An apparatus for wireless communication in a user equipment (UE), comprising:
   a controller adapted to determine a first power for transmitting both first data and control information on a first physical uplink shared channel (PUSCH), to determine a second power for transmitting second data on a second PUSCH, and to reduce the second power if a sum of the determined first power and the determined second power exceeds a predetermined value; and
   a transmitter adapted to transmit the first data and the control information on the first PUSCH using the determined first power, and to transmit the second data on the second PUSCH using the reduced second power.

7. The apparatus of claim 6, wherein the reduced second power is less than or equal to a value obtained by subtracting the first power from the predetermined value.

8. The apparatus of claim 6, wherein the predetermined value is a maximum power allowed for the UE.

9. The method of claim 6, wherein the control information comprises at least one of a Hybrid Automatic Repeat reQuest ACKnowledgment (HARQ-ACK) and channel quality information.

10. The method of claim 6, wherein the first and second PUSCHs are transmitted in respective component carriers.

11. A method for wireless communication by a base station (BS), comprising:
    configuring, to a user equipment (UE), a first physical uplink shared channel (PUSCH) conveying both first data and control information and a second PUSCH conveying second data;
    transmitting parameters required for transmission power control of the first and second PUSCHs; and
    receiving the first data and the control information on the first PUSCH and the second data on the second PUSCH,
    wherein the second power is reduced if a sum of a first power determined for transmitting the first PUSCH by the UE and a second power determined for transmitting the second PUSCH by the UE exceeds a predetermined value, and
    wherein the first PUSCH is transmitted with the first power and the second PUSCH is transmitted with the reduced second power.

12. The method of claim 11, wherein the reduced second power is less than or equal to a value obtained by subtracting the first power from the predetermined value.

13. The method of claim 11, wherein the predetermined value is a maximum power allowed for the UE.

14. The method of claim 11, wherein the control information comprises at least one of a Hybrid Automatic Repeat reQuest ACKnowledgment (HARQ-ACK) and channel quality information.

15. The method of claim 11, wherein the first and second PUSCHs are transmitted in respective component carriers.

16. An apparatus for wireless communication in a base station (BS), comprising:
    a controller adapted to configure, to a user equipment (UE), a first physical uplink shared channel (PUSCH) conveying both first data and control information and a second PUSCH conveying second data;

a transmitter adapted to transmit parameters required for transmission power control of the first and second PUSCHs; and a receiver adapted to receive the first data and the control information on the first PUSCH and the second data on the second PUSCH, wherein the second power is reduced if a sum of a first power determined for transmitting the first PUSCH by the UE and a second power determined for transmitting the second PUSCH by the UE exceeds a predetermined value, and wherein the first PUSCH is transmitted with the first power and the second PUSCH is transmitted with the reduced second power.

17. The apparatus of claim 16, wherein the reduced second power is less than or equal to a value obtained by subtracting the first power from the predetermined value.

18. The apparatus of claim 16, wherein the predetermined value is a maximum power allowed for the UE.

19. The apparatus of claim 16, wherein the control information comprises at least one of a Hybrid Automatic Repeat reQuest ACKnowledgment (HARQ-ACK) and channel quality information.

20. The apparatus of claim 16, wherein the first and second PUSCHs are transmitted in respective component carriers.

* * * * *